(12) United States Patent
Jarman et al.

(10) Patent No.: US 6,354,382 B1
(45) Date of Patent: Mar. 12, 2002

(54) POSITIONABLE WORK IMPLEMENT

(75) Inventors: Kenneth M. Jarman, Othello, WA (US); George R. McKemie, Pelham, GA (US); Ernest W. Lee, III, Truxton, MO (US)

(73) Assignee: LMC Bainbridge, LLC, Bainbridge, GA (US)

( * ) Notice: Subject to any disclaimer, the term of this patent is extended or adjusted under 35 U.S.C. 154(b) by 0 days.

(21) Appl. No.: 09/592,684

(22) Filed: Jun. 12, 2000

Related U.S. Application Data

(60) Provisional application No. 60/181,058, filed on Feb. 8, 2000.

(51) Int. Cl.[7] .............................................. A01B 73/00
(52) U.S. Cl. ........................................ 172/213; 172/776
(58) Field of Search ................................ 172/213, 219, 172/212, 214, 215, 776

(56) References Cited

U.S. PATENT DOCUMENTS

| | | | |
|---|---|---|---|
| 3,121,305 A | 2/1964 | Van Der Lely et al. | 56/377 |
| 3,128,589 A | 4/1964 | Van Der Lely et al. | 56/377 |
| 3,568,423 A | 3/1971 | Hale et al. | 56/377 |
| 4,245,458 A | 1/1981 | Smith | 56/376 |
| 4,343,142 A | 8/1982 | Allen | 56/377 |
| 4,685,282 A | 8/1987 | Allen | 56/377 |
| 4,723,401 A | 2/1988 | Webster et al. | 56/377 |
| 4,932,197 A | 6/1990 | Allen | 56/377 |
| 5,000,267 A | 3/1991 | Harrell | 172/219 |
| 5,020,603 A | 6/1991 | Harrell | 172/131 |
| 5,076,368 A | 12/1991 | Harrell | 172/219 |
| 5,078,217 A | 1/1992 | Harrell | 172/219 |
| 5,154,239 A | 10/1992 | Harrell et al. | 172/269 |
| 5,267,618 A | 12/1993 | Harrell | 172/219 |
| 5,400,859 A | 3/1995 | Harrell | 172/219 |
| 5,459,987 A | 10/1995 | Hining et al. | 56/366 |

*Primary Examiner*—Christopher J. Novosad
(74) *Attorney, Agent, or Firm*—Hunton & Williams

(57) ABSTRACT

A positionable work implement with an increased working width. The positionable work implement includes a main frame, and wheel assemblies and implement assemblies mounted on the main frame. The main frame is pivotable about a vertical axis, pivoting between several working positions and a travelling position wherein the effective transverse width of the frame in the travelling position is reduced relative to the effective transverse width of the frame in the various working positions. The implement assemblies may include rotary basket hay rakes with a center idler wheel to increase the effective working width of the hay rake. Also, the rotary basket hay rakes may be mounted in tandem, working together, to increase the effective working width of the raking mechanism. Finally, a self-propelled version of the positionable work implement is contemplated.

28 Claims, 16 Drawing Sheets

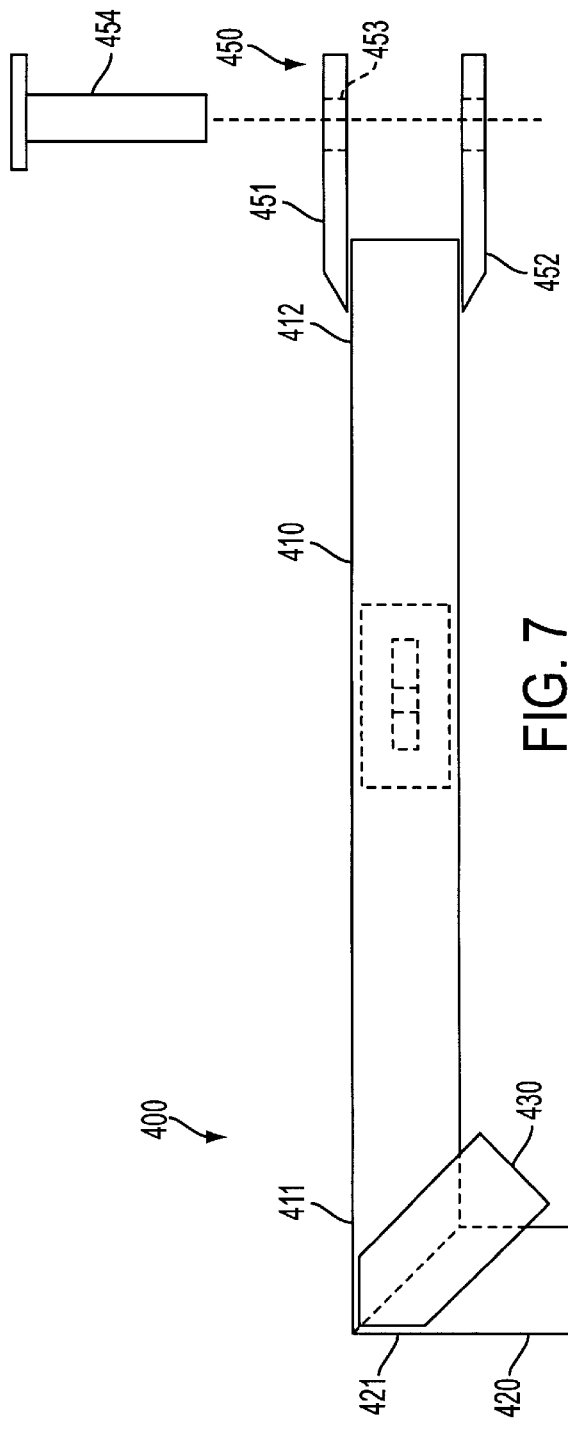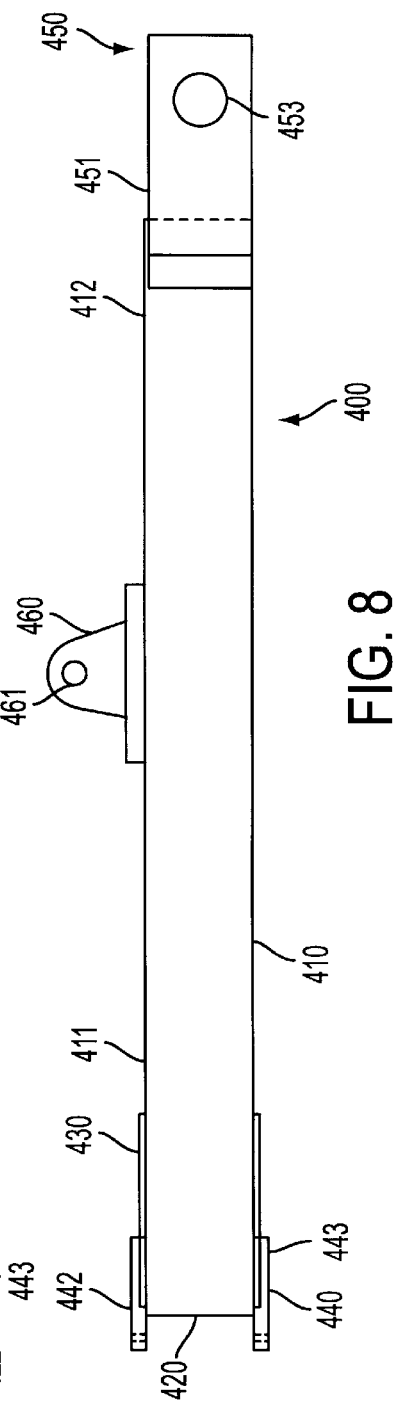

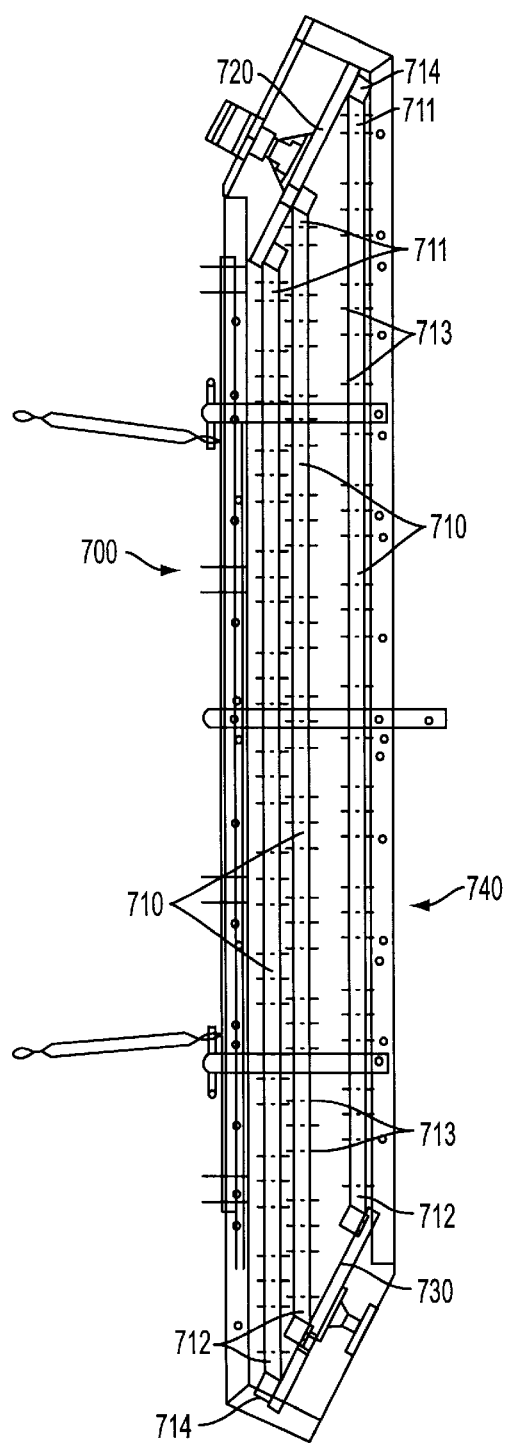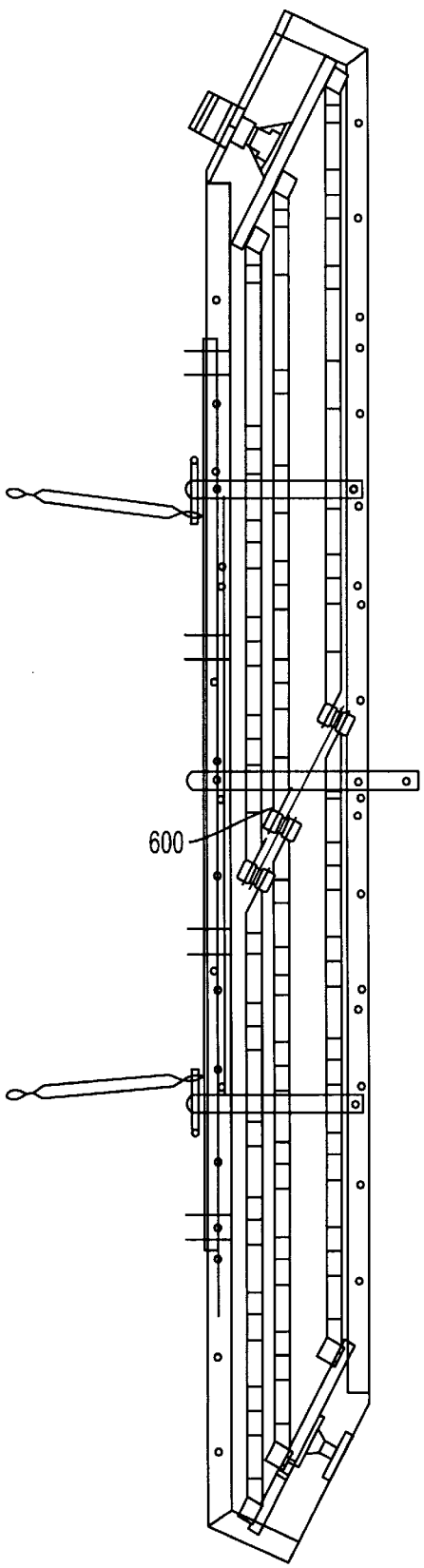
FIG. 10
FIG. 11

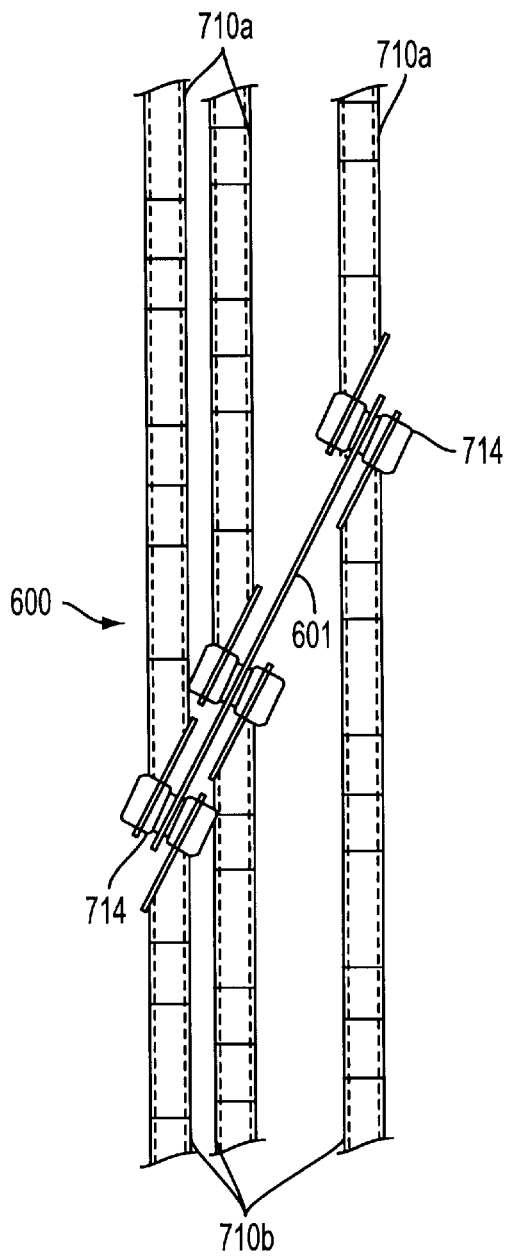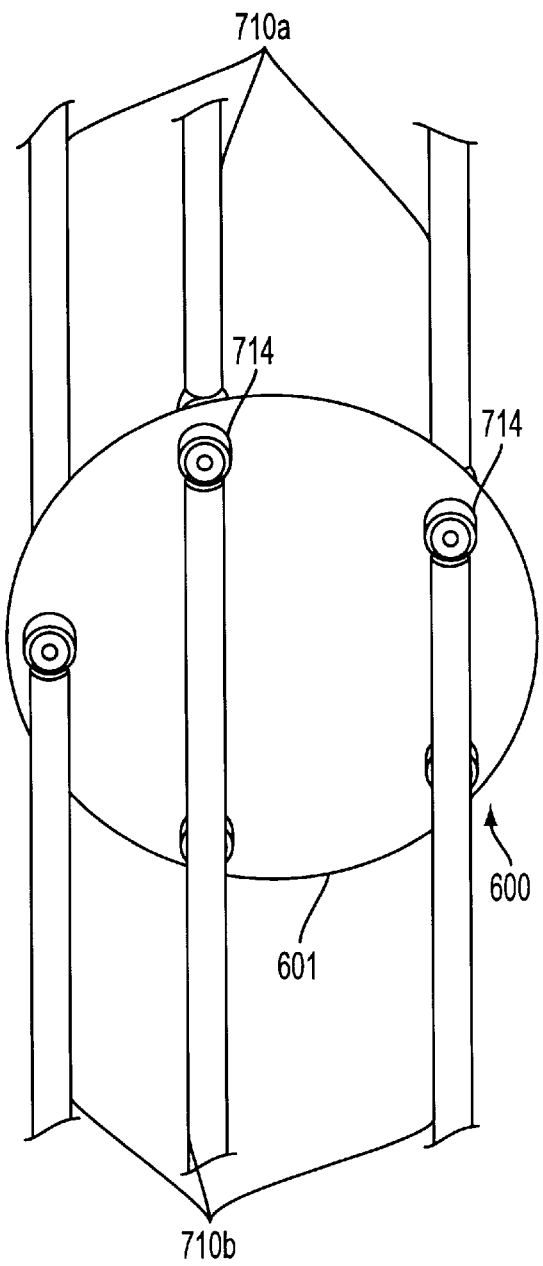
FIG. 12A
FIG. 12B

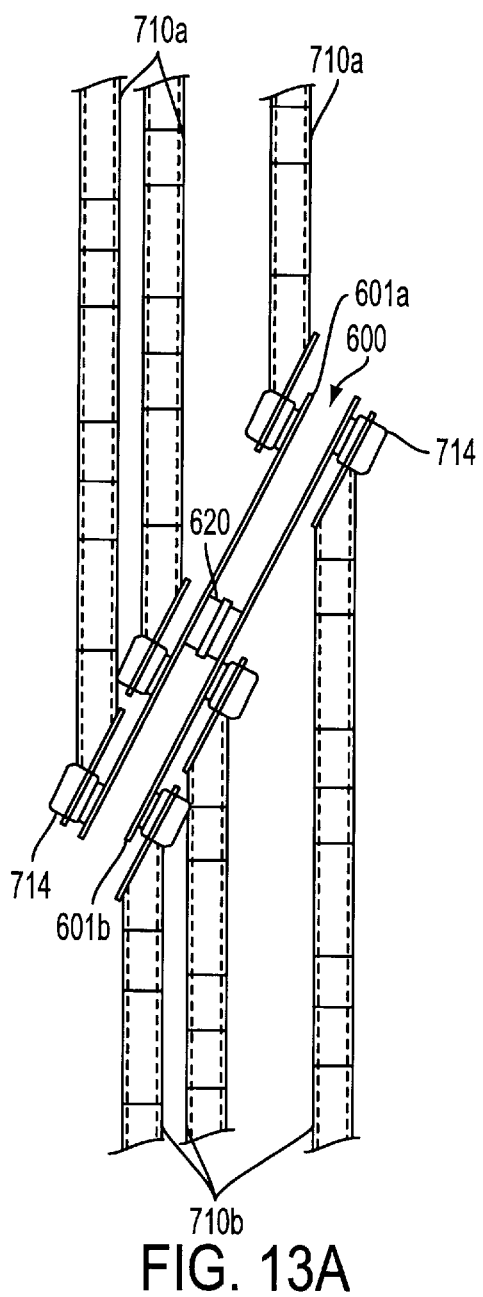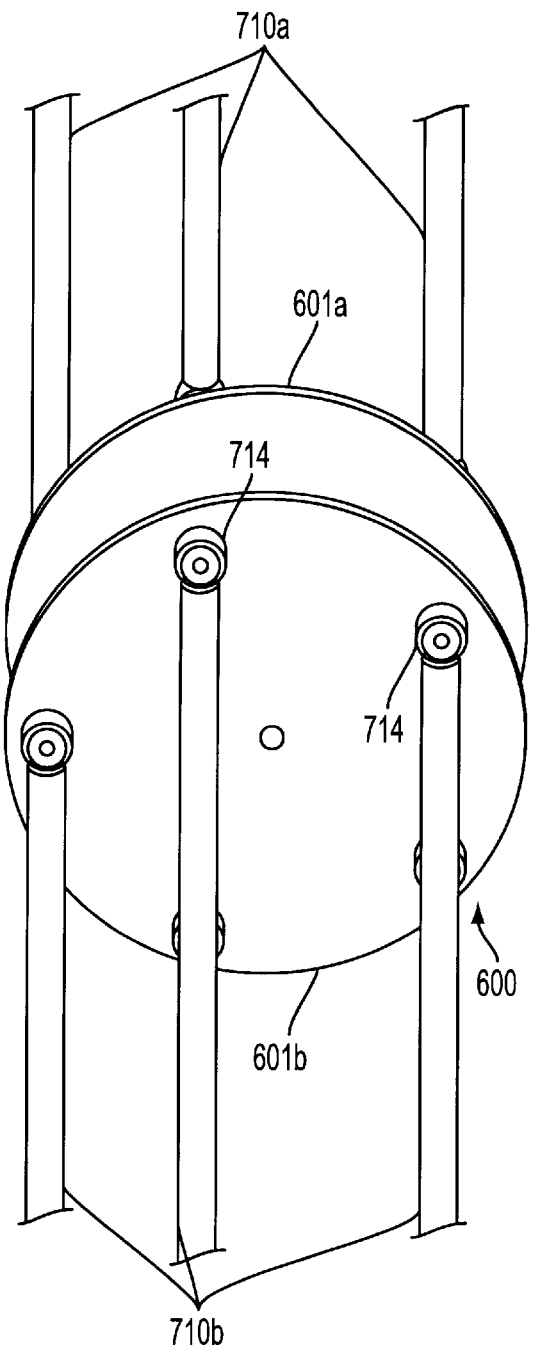
FIG. 13A
FIG. 13B

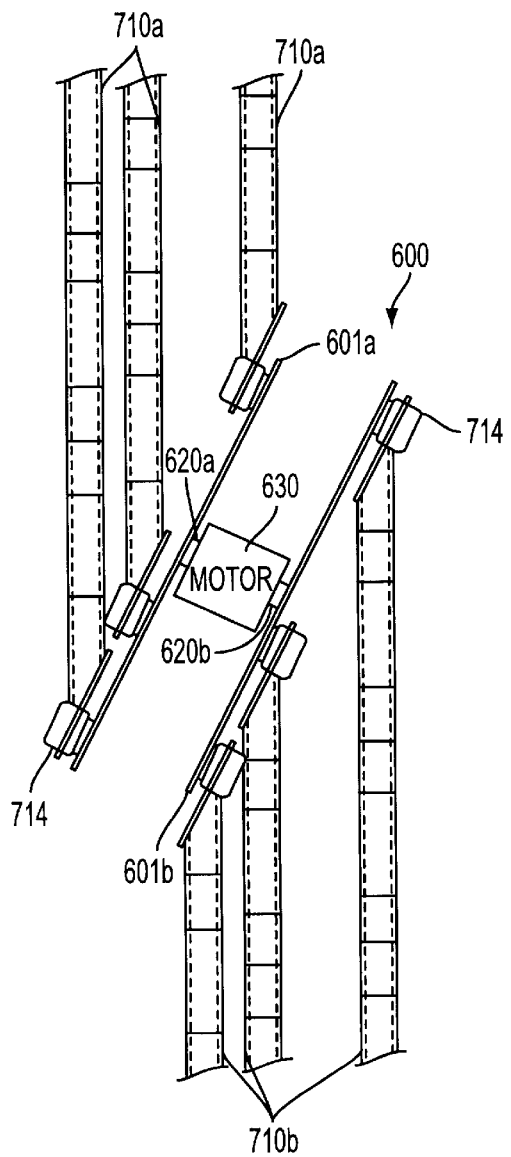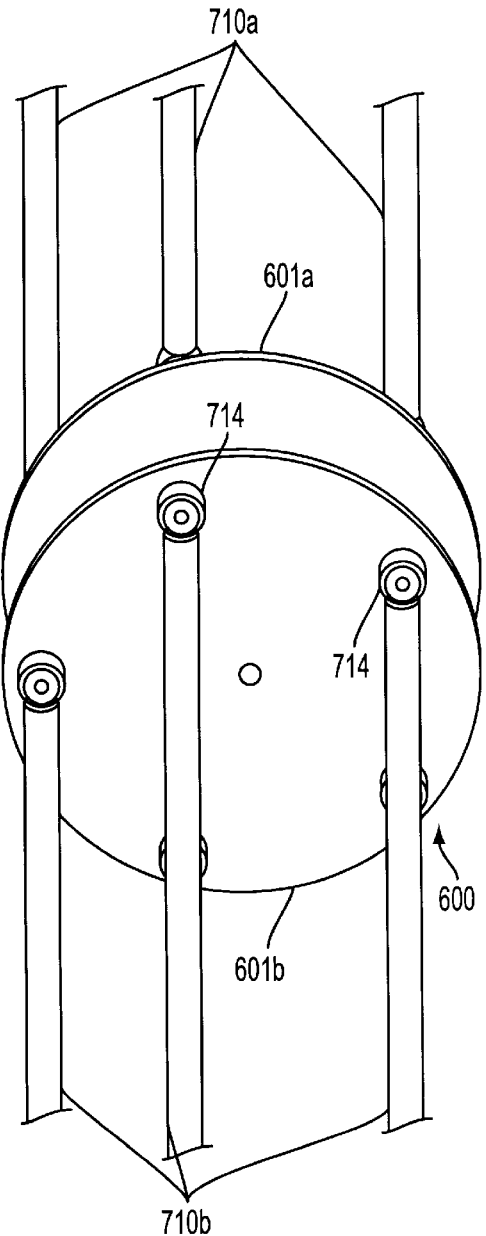
FIG. 14A
FIG. 14B

POSITIONABLE WORK IMPLEMENT

This appln claims benefit of Prov. No. 60/181,058 filed Feb. 8, 2000.

BACKGROUND OF THE INVENTION

1. Field of the Invention

The present invention relates to work implements and to apparatuses for positioning work implements in the agricultural and construction fields, and more particularly to increasing the effective width of work implements and to increasing the effective width which apparatuses for positioning work implements deploy those work implements.

2. Description of the Related Art

Positionable work implements useful for performing a variety of tasks, for example tasks associated with the processing of crops in a field, have long been known. An exemplary positionable work implement is disclosed in U.S. Pat. No. 4,932,197 to Allen. The Allen work implement is useful as a hay rake and is capable of being positioned in work and travel positions for performing a variety of tasks. While various designs for positionable work implements have been used with varying success, they all possess certain shortcomings which constitute the motivation for the present invention. More particularly, the effective working widths of all of the known work implements are more or less limited. Limitations to the effective working widths of these known positionable work implements limit their speed and efficiency at performing their designated tasks.

In the production of hay (or haying), for example, the limitation to the effective working width of hay rakes also limits the speed and efficiency of hay rakes in processing crops. An increase in speed and efficiency of hay rakes is needed to more cost effectively produce hay.

Haying involves the conversion of alfalfa, clover, birdsfoot, oats, grasses, and other crops into a form suitable for long-term storage. A first step in haying is to mow the crop. A swather or windrower mows the green plants along an operator directed path, often circular or back-and-forth, cutting swaths across a field. If a windrower is used, the windrower deposits the cut green plants in a continuous, narrow row called a windrow. If a swather is used, the cut green plants fall evenly behind the swather, and a raking step follows to gather the plants into windrows.

The cut green plants most often require drying before they can be stored for an extended period of time. The windrows are thus left in the field for one or more days to dry the plants. The top layer of the windrow generally dries most readily due to maximum exposure to light and air. The bottom layer and the interior of the windrow are more insulated from light and air and thus do not dry as readily as the top layer. In order to more quickly dry all of the cut plants in the windrow, an over-turning operation can be performed. A hay rake can be used to overturn the windrows to expose the green, wet cut plants underneath to light and air for drying. Over-turning may be performed once or several times until the windrow is sufficiently dry and prepared for storage. When the cut plants are sufficiently dry, a baler can be employed to pack them into bales, if desired, for long-term storage.

Haying is a labor and capital intensive endeavor. As explained above, several different operations are usually necessary before the hay is ready for storage. Each of these operations usually involves an operator passing crop processing equipment through the field. Increasing the speed and efficiency at which these operations are performed reduces the amount of equipment and labor necessary to perform these operations. Since the maximum speed at which the crop processing equipment passes through the field to process the crops is usually limited by the design of the equipment and the terrain of the field, the best way to increase the speed and efficiency of the crop processing equipment is to increase the working width of the equipment, which increases the width of the swath of field processed with each pass.

In haying, increasing the working width of a hay rake minimizes the number of passes through a field necessary to perform a raking or an over-turning operation. If the hay rake is used to gather multiple windrows into a single windrow, then the increase in speed and efficiency, due to the rake's increased working width, can extend also to other equipment which performs previous and subsequent operations on the field. For example, if a hay rake is used to gather two windrows into a single windrow, then an increase in the working width of the hay rake permits a corresponding increase in the distance between the windrows, and thus a corresponding increase in the working width of the windrower and a resultant increase in the speed and efficiency of the windrower. As another example, if two windrows are gathered into a single windrow by a hay rake, then the number of passes necessary for a baler to later gather the crop from the windrows and into bales can be reduced (because there are fewer windrows) resulting in an increase in speed and efficiency of the baler.

As is shown by the above discussion of haying, it is advantageous to use the widest possible haying equipment. For other purposes as well, such as for the processing of bean crops before harvesting, and other operations in the agricultural and construction fields, it is advantageous to use the widest possible processing equipment. There is, thus, a substantial need for such equipment.

Several factors have limited the maximum working width of positionable work implements. One factor is the method of transportation of the equipment from field to field. The positionable work implement must generally be transported on roads shared with other traffic. The positionable work implement must therefore be capable of configuration for road transport to a certain maximum width, i.e., a width which safely allows opposing traffic to pass on the road.

U.S. Pat. No. 4,343,142, partially addressed the above-mentioned limitation to the maximum working width of positionable work implements. The '142 patent discloses a positionable work implement with a main frame wherein sections of the frame transverse to the direction of travel are telescopically received within other sections. Two implement assemblies pivotally attach to the main frame at the ends of these telescoping transverse sections. Before travelling on a road, the transverse width of the main frame may be reduced by telescopically retracting the sections of the main frame within one another. For operation of the work implements in a field, the main frame may be telescopically extended in a transverse direction, thereby increasing the width of the main frame and the working width of the positionable work implement.

Despite the use of this type of telescopic adjustment of a positionable work implement, the maximum working width of a positionable work implement is still limited to at most three times the width of the main frame in its narrowest configuration, due to mechanical constraints. More specifically, the length of the telescoping sections generally cannot be greater than the width of the main frame, without compromising the structural integrity of the frame.

SUMMARY OF THE INVENTION

The primary object of the present invention is to provide a positionable work implement with a wider working width than was previously possible while still allowing the positionable work implement to be configured for safe transport on a road.

In one embodiment according to the present invention, a positionable work implement has a pivotally adjustable frame to permit rotational adjustment of the frame about a vertical axis. The apparatus includes a main frame provided with a transverse frame section, upon which at least one work implement is mounted. The apparatus also includes a connection assembly for pivoting the transverse frame section about a vertical axis. The apparatus also has at least one ground traversing element pivotally mounted on the main frame for movement about a vertical axis such that the ground traversing element may be oriented substantially parallel to the direction of travel for any orientation of the transverse frame section. In operation, the transverse frame section may be pivoted about a vertical axis to an orientation in which its effective transverse width is reduced to facilitate transport, and pivoted about a vertical axis to another orientation in which its effective transverse width is maximized to deploy the work implements in the widest possible configuration to increase speed and efficiency.

In another embodiment, the present invention provides work implements having a greater effective width. Such work implements include an additional device for supporting rake tine bars to thereby overcome the mechanical constraints on the width of the work implements.

The first and second embodiments may be combined in any suitable manner to further maximize the effective working width of a positionable work implement.

BRIEF DESCRIPTION OF THE DRAWINGS

FIG. 7 is a side view of an illustrative embodiment of a tongue assembly for a positionable work implement according to the present invention.

FIG. 8 is a top view of the tongue assembly of FIG. 7.

FIG. 10 is a schematic top view of an illustrative embodiment of an implement assembly for a positionable work implement according to the present invention.

FIG. 11 is a schematic top view of another illustrative embodiment of an implement assembly for a positionable work implement according to the present invention.

FIG. 12A is an enlarged schematic top view of the implement assembly of FIG. 11.

FIG. 12B is an enlarged schematic side view of the implement assembly of FIG. 11.

FIG. 13A is a schematic top view of another illustrative embodiment of an implement assembly for a positionable work implement according to the present invention.

FIG. 13B is an schematic side view of the implement assembly of FIG. 13A.

FIG. 14A is a schematic top view of another illustrative embodiment of an implement assembly for a positionable work implement according to the present invention.

FIG. 14B is an schematic side view of the implement assembly of FIG. 14A.

DETAILED DESCRIPTION OF THE PREFERRED EMBODIMENTS

Figure 1:
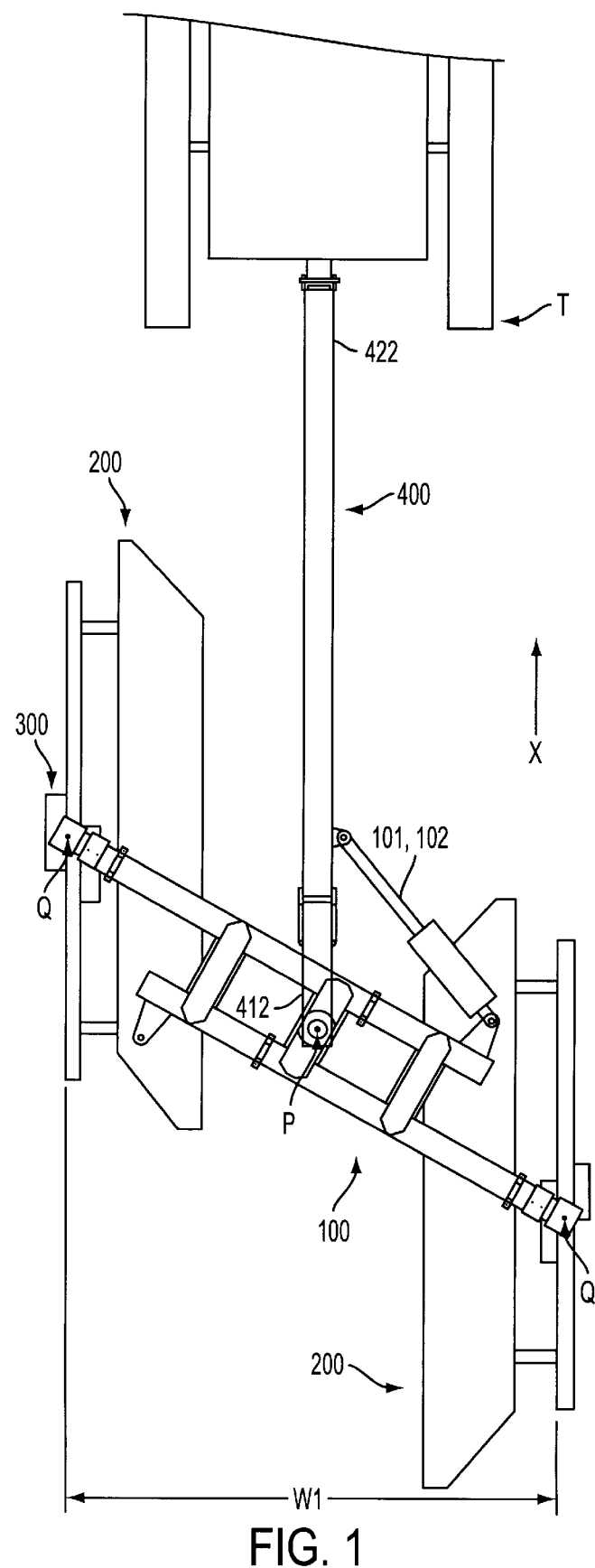
FIG. 1 is a top view of an illustrative embodiment of a positionable work implement according to the present invention in a transport position.

With reference to FIG. 1, a frame assembly 100 supports one or more implement assemblies 200. The implement assemblies 200 may be hay rakes, crop collection and harvesting devices, brooms, etc. Two or more ground engagement assemblies, which are in this embodiment wheel assemblies 300, attach to the frame assembly 100 to provide support from the ground for the frame assembly 100 and other components. However, the ground engagement assemblies could also be track assemblies or skid assemblies, as will be appreciated by those of skill in the art. In this embodiment, which is equipped to be towed behind a tractor or other suitable vehicle, a connection assembly such as a tongue assembly 400 is pivotally attached at end 412 to the frame assembly 100 and is configured to be attached at 422 to a tractor T or other suitable vehicle for propelling the frame assembly 100 and other components in a direction of travel X.

Figure 2:
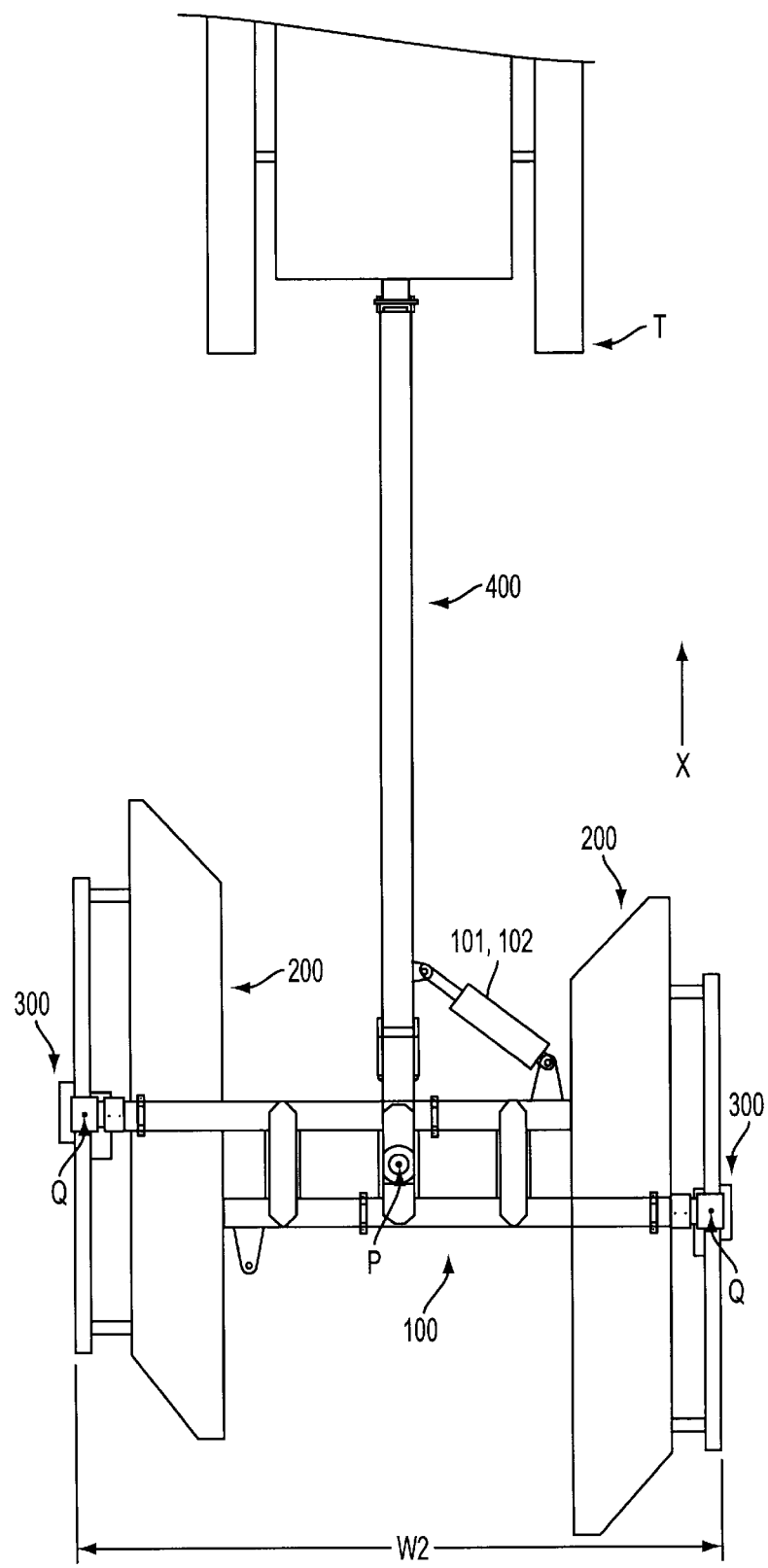
FIG. 2 is a top view of an illustrative embodiment of a positionable work implement according to the present invention in a working position.

The frame assembly 100 is pivotable about a vertical axis P, to adjust the frame assembly 100 into a transport position, shown in FIG. 1, and several working positions, one such shown in FIG. 2. In the transport position of FIG. 1, the frame assembly 100 is pivoted about the vertical axis P to an orientation relative to the direction of travel X which reduces the effective transverse width of the frame assembly 100 relative to its working positions to W1. In the work position of FIG. 2, the frame assembly 100 has been pivoted about the vertical axis P to an orientation relative to the direction of travel X which increases the effective transverse width of the frame assembly 100, relative to its transport position, to W2. The wheel assemblies 300 are mounted to the frame assembly 100 for pivotal movement about vertical axes Q. Pivoting of the wheel assemblies 300 about the vertical axes Q relative to the frame assembly 100 permits alignment of the wheel assemblies 300 with the direction of travel X when the frame assembly pivots between its transport and working positions.

In addition to the transport and the several working positions, the frame assembly 100 may assume a shipping position. The shipping position (not shown) of the frame assembly 100 is similar to the transport position shown in FIG. 1, where the frame assembly 100 is pivoted to reduce its effective transverse width. However, in the shipping position, a swing link, further described hereinafter, is disconnected from the frame assembly 100 to allow an even greater degree of pivoting than is possible in the transport position of FIG. 1, and to allow a further decrease of the effective transverse width of the frame assembly 100 relative to the width W1 in the transport position.

Figure 3:
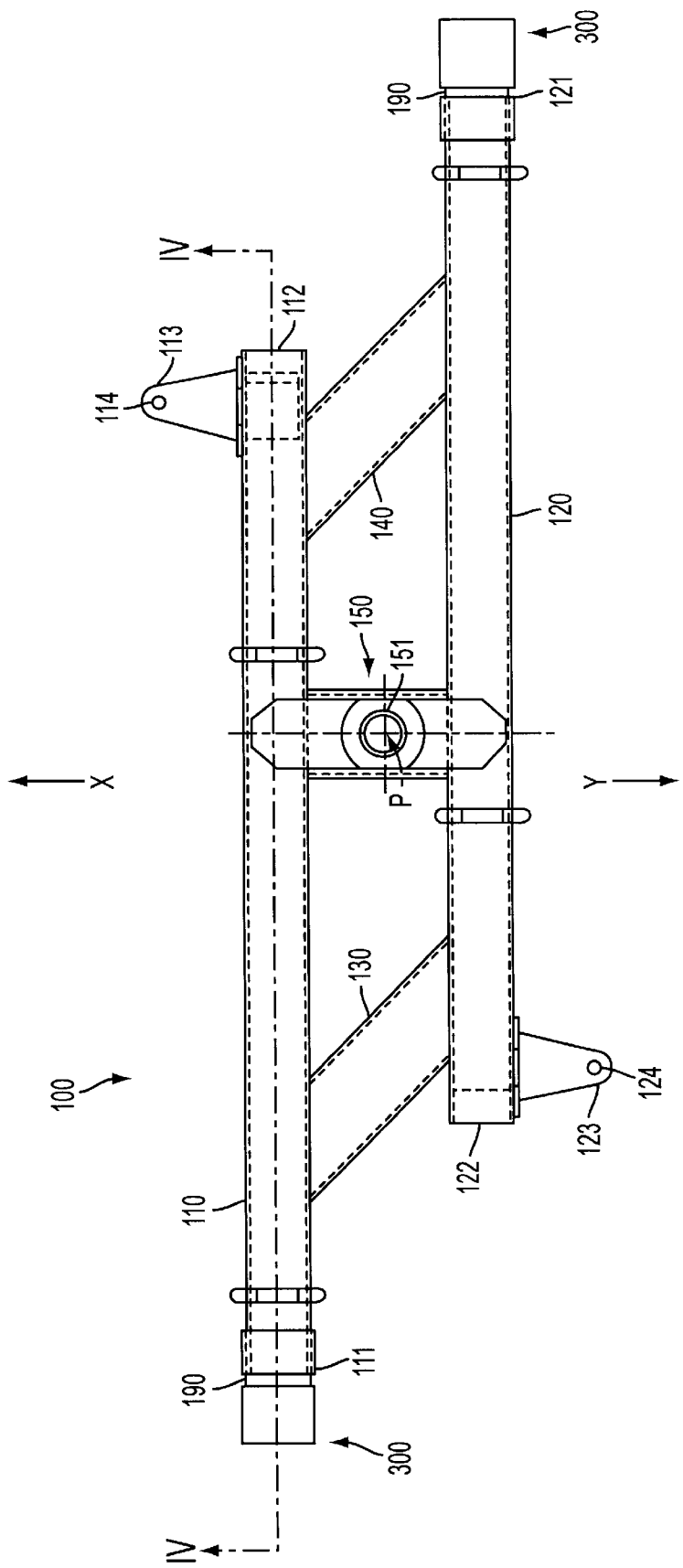
FIG. 3 is a top view of an illustrative embodiment of a frame assembly for a positionable work implement according to the present invention.
Figure 4:
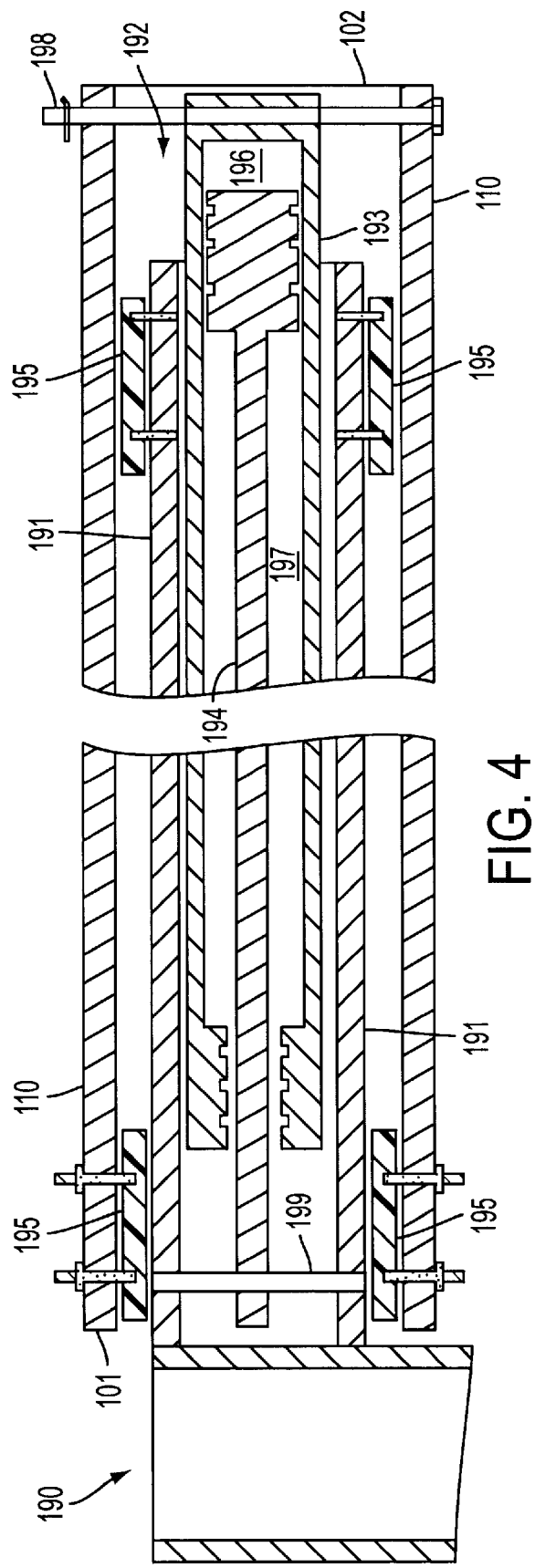
FIG. 4 is a sectional view of the frame assembly of FIG. 3 taken along cutting plane IV—IV.

FIGS. 3 and 4 illustrate one embodiment of a frame assembly 100 for a positionable work implement according to the present invention. As understood by those of skill in the art, the frame assembly 100 may comprise a variety of arrangements of frame members and other components of various shapes, and may be assembled using a variety of fastening techniques. The frame assembly 100 of this embodiment comprises a pair of lateral members 110, 120. Lateral member 110 has a first end 111 and a second end 112 disposed in opposite transverse directions of the apparatus. Lateral member 120 similarly has a first end 121 and a second end 122 disposed in opposite transverse directions of the apparatus. The pair of lateral members 110, 120 are interconnected to one another by a pair of cross members 130, 140. The cross members 130, 140 provide structural rigidity to the frame assembly 100 and may be in any orientation or position suitable for this purpose.

The frame assembly 100 pivots about a vertical axis P relative to the direction of travel X of the apparatus, as will be described in further detail hereinafter. In the present embodiment, equipped to be towed behind a tractor or other suitable vehicle, a frame swing mount 150 defines the vertical pivoting axis P and is an attachment point for attaching a tongue assembly 400 to the frame assembly 100. Those of skill in the art will recognize that a frame swing mount 150 may be attached to the frame assembly 100 at any suitable location on the frame assembly 100. In the present embodiment, the frame swing mount 150 attaches to the frame assembly 100 at a location midway between the lateral members 110, 120 and approximately midway between the cross members 130, 140.

The frame swing mount 150 forms part of a clevis-type connection, shown best in FIG. 7, which, in this embodiment, is made between the frame assembly 100 and the tongue assembly 400. In this clevis-type connection, one part to be connected has two parallel and spaced-apart forks 451, 452 with an empty space in between them. The two forks 451, 452 have axially aligned through holes which define a bore 453. The other part to be connected in the clevis connection has a projecting portion defining a bore 151, shown in FIG. 3. The two parts are connected by axially aligning the bore 453 of the one part with the bore 151 of the other part, and inserting a clevis pin 454 into each bore 151, 453.

Two swing link mount plates 113, 123 may be attached to the lateral members 110, 120 respectively. Those of ordinary skill in the art will recognize that the swing link mount plates 113, 123 may be attached at any suitable location to the frame assembly 100. In the present embodiment, the swing link mount plates 113, 123 are attached to the lateral members 110, 120 near the second ends 112, 122, respectively. The swing link mount plates 113, 123 are provided as attachment points for a swing link.

A swing link, shown in FIGS. 1 and 2, may be provided to fix the pivoted position of the frame assembly 100. The swing link may comprise an adjustable link fixable in one of several positions, such as a pair of telescoping tubes which are locked together at various indexed positions by a pin. Or the swing link may comprise a set of individual, non-adjustable links, each one of a predetermined length. A first end of a swing link may be attached to an attachment point on the frame assembly 100, and a second end may be attached to any suitable fixed element for fixing the frame assembly 100 in a predetermined, desirable pivoted position. In the embodiment of FIGS. 1 and 2, the swing link comprises a swing actuator 101, which in the present embodiment further comprises a hydraulic cylinder 102, attached between the frame assembly 100 and the tongue assembly 400. Instead of a hydraulic cylinder 102, the swing actuator 101 may also be a pneumatic cylinder, an electric lead screw, or any other of a number of mechanisms, as recognized by those of ordinary skill in the art. The swing actuator 101 both fixes the pivoted position of the frame assembly 100, and is capable of generating torque about axis P to change the pivoted position of the frame assembly 100. Swing actuator 101 may attach to the swing link mount plates 113, 123, through the bores 114, 124 via any suitable fastener, such as a bolt.

Alternatively, provision may be made to lock the position of the frame assembly 100 relative to the connection assembly at frame swing mount 150, as those of skill in the art will recognize. For example, indexed holes may be provided in the clevis hitch so that when a pin is inserted into the indexed holes, the frame assembly 100 will not pivot relative to the connection assembly.

In the embodiment of FIG. 3, by providing two swing link mount plates 113, 123 to which the swing actuator 101 may be mounted, the frame assembly 100 obtains a bi-directional capability. A bi-directionally capable frame may be operated in a first direction of travel or a second direction of travel, opposite the first. In the configuration depicted in FIGS. 1 and 2, the tongue assembly 400 attaches to the frame assembly 100 at the frame swing mount 150, with the tongue assembly 400 extending in the direction of travel X for operating the apparatus in the direction of travel X. In this configuration, the swing actuator 101 will connect to the frame assembly 100 at the swing link mount plate 113. Or, as desired by the operator, the apparatus may be operated in a direction of travel Y by reversing the tongue assembly 400, with the tongue assembly mounted to the frame assembly 100 at the frame swing mount 150, and with the tongue assembly extending in the direction of travel Y. In this configuration, the swing actuator 101 will connect to the frame assembly 100 at the swing link mount plate 123.

The wheel assemblies 300 may be attached to the lateral members 110, 120 at their respective first ends 111, 121. Or, as in the embodiment of FIG. 3, the wheel assemblies 300 may be attached to the lateral members 110, 120 via leg extensions 190, which may be provided and are controllably extended and retracted relative to the frame assembly 100. The leg extensions 190 are telescopically received inside of the lateral members 110, 120 and extend from the first ends 111, 121, as shown in FIG. 3.

FIG. 4 is a sectional view of a leg extension 190 and lateral member 110. The operation of the leg extension 190 with lateral member 120 is substantially similar to its operation with lateral member 110, thus the leg extension 190 with lateral member 120 is not shown. Each leg extension 190 comprises a leg extension tube 191. In the present embodiment, the leg extension tubes 191 and the lateral members 110, 120 are square-section tubes. Those of skill in the art will recognize that they may be any desired shape. The leg extension tube 191 is smaller than the lateral member 110 to permit the leg extension tube 191 to slide in and out of the lateral member 110 by way of its first end 111. Four bearing pads 195 are located on each of the four internal faces of the square-section lateral member 110 near its first end 111. In the embodiment of FIG. 4, the bearing pads 195 are secured to the interior of the first end 111 using fasteners attached to the pads 195, the fasteners passing through the first ends 111 and being held in place with nuts on the exterior of the lateral member 110. However, those of skill in the art will recognize that any suitable fastening arrangement may be used to secure the bearing pads 195 to the lateral member 110. Four additional bearing pads 195 are secured to the extension arm tube 191. One pad 195 is secured to each of the four exterior faces of the square-section extension arm tube 191. The four additional bearing pads 195 can likewise be secured to the extension arm tube 191 using any suitable fastening arrangement.

The extension and retraction of the extension arm 190 relative to the frame assembly 100 may be accomplished manually, if desired, and the relative position of the extension arm 190 may be fixed by inserting pins into alignable indexing holes provided in both the extension arm 190 and the lateral member 110. Or, as in the embodiment of FIG. 4, the extension and retraction of the extension arm 190 relative to the frame assembly 100 may be controlled by an extension actuator 192. In this embodiment, the extension actuator 192 comprises a hydraulic extension cylinder. However, the extension actuator 192 may also comprise a pneumatic cylinder, an electric lead screw, or any other of a number of mechanisms, as recognized by those of skill in the art. The hydraulic extension cylinder has a cylinder portion 193 and a ram 194. The ram 194 is received within the cylinder portion 193 in a manner forming first and second chambers 196 and 197. By forcing hydraulic fluid into the first chamber 196, the ram 194 is extended. By forcing hydraulic fluid into the second chamber 197, the ram 194 is retracted. The cylinder portion 193 of the hydraulic extension cylinder is fastened to a lateral member 110 or 120 with a pin 198. The ram 194 of the hydraulic extension cylinder is fastened to the leg extension tube 191 with a pin 199. With this construction, when the ram 194 is extended, the leg extension tube 191 is extended out of the lateral member 110.

Figure 5:
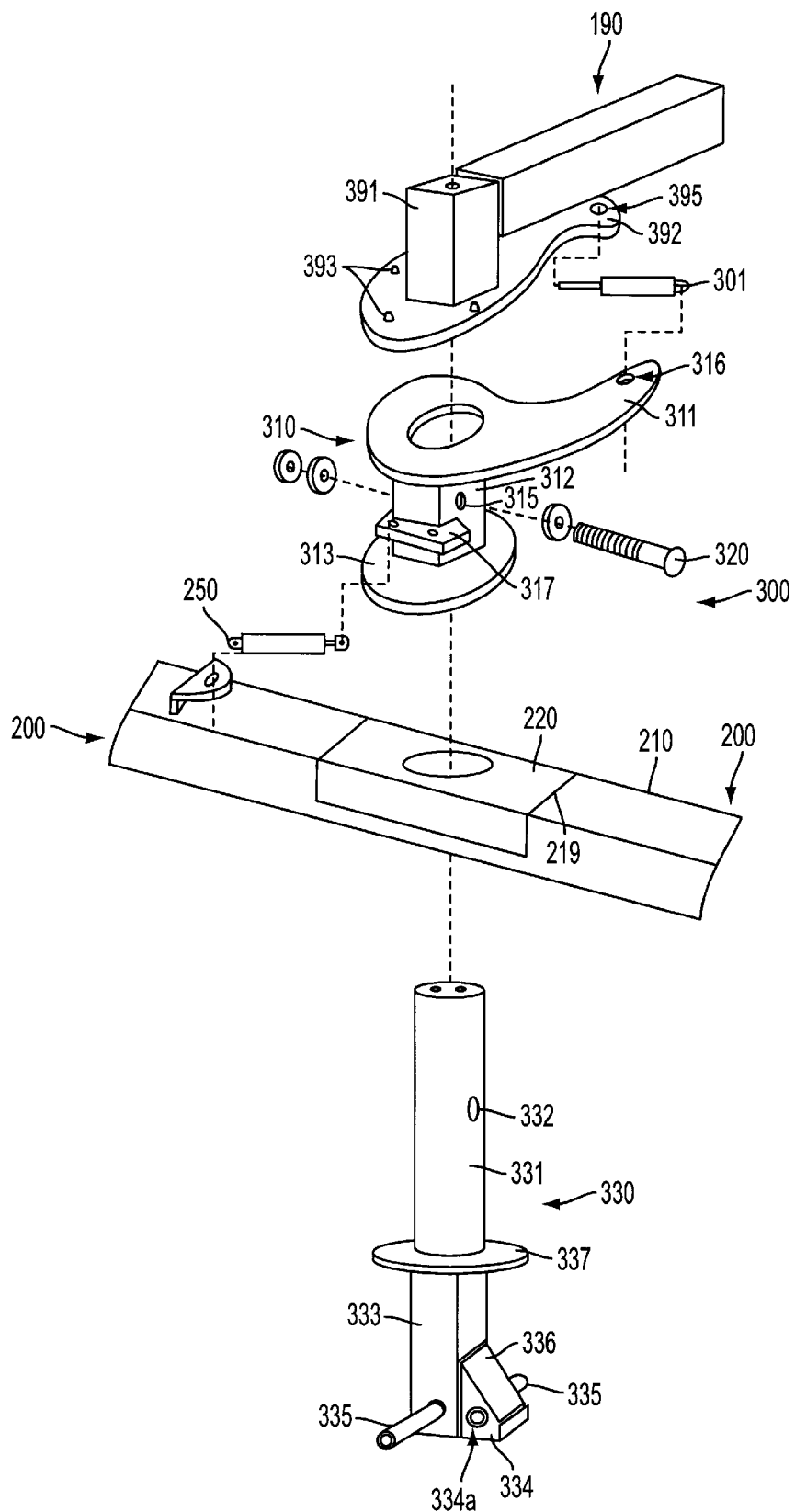
FIG. 5 is an exploded view of an illustrative embodiment of a wheel assembly for a positionable work implement according to the present invention.
Figure 6:
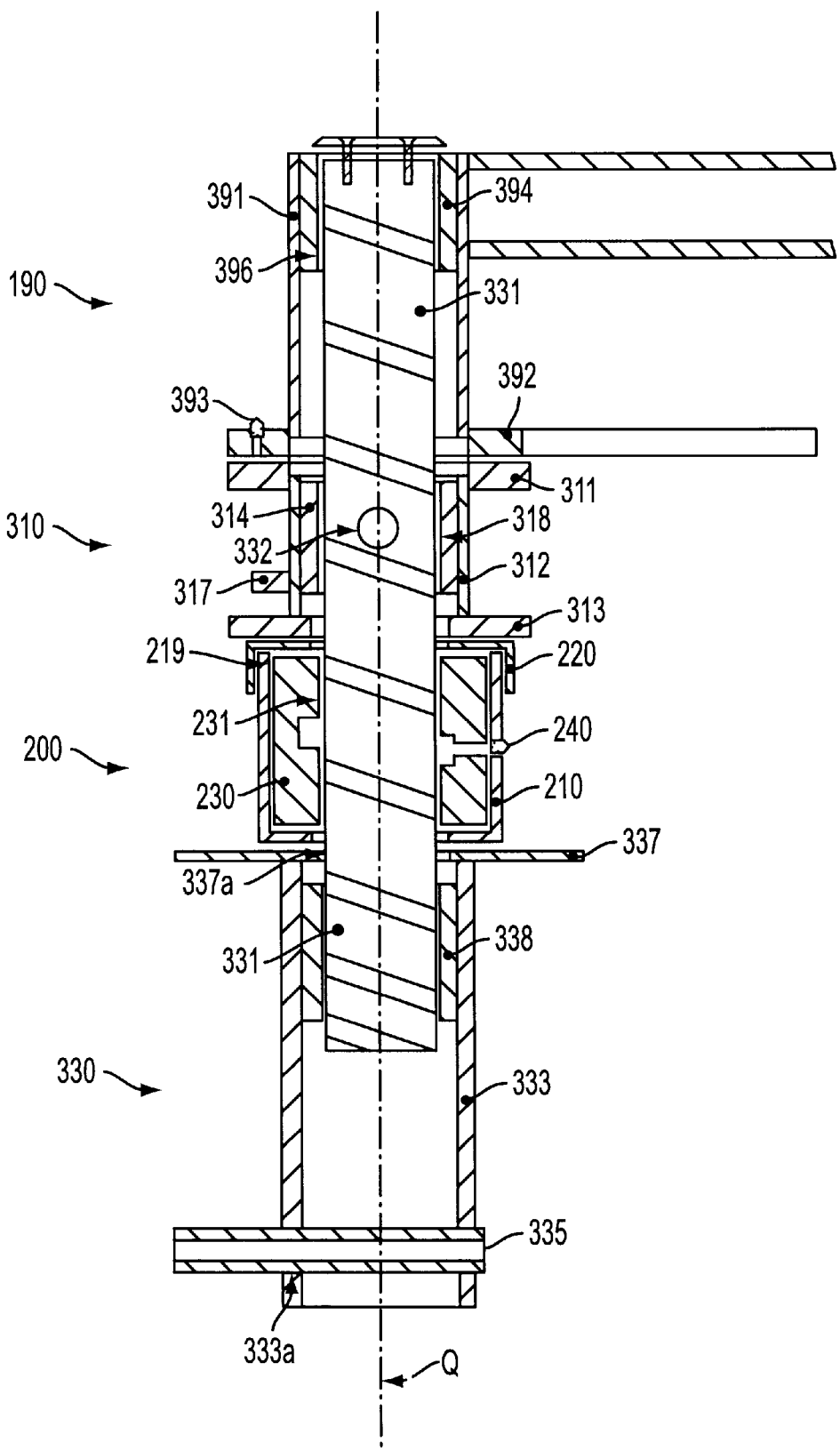
FIG. 6 is a sectional view of the wheel assembly of FIG. 5.

FIGS. 5 and 6 illustrate a left-hand side embodiment of a wheel assembly 300 according to the present invention. The right-hand side wheel assembly, which is not shown, is essentially similar to the left-hand side wheel assembly 300 except that it is adapted to function on the opposite side of the frame 100. For simplicity, the wheel assembly 300 will be described in terms of the left-hand side embodiment only. It will be understood by those of skill in the art that this is only one of many possible designs for a wheel assembly 300.

An end portion of the extension arm 190 of the frame assembly 100 is attached to a vertically aligned drop tube 391. An extension arm cylinder mount 392 is attached to the bottom of the drop tube 391. The extension arm cylinder mount 392 defines a bore 395 for connecting a steering link, described in further detail hereinafter, to the extension arm 190. Upper pivot bushing 394 is attached to the interior of the drop tube 391. The extension arm cylinder mount 392 and the upper pivot bushing 394 define a bore 396 for receiving the lower axle 330. The extension arm cylinder mount 392 includes three grease fittings 393.

A pivot fixture 310 comprises a pivot fixture cylinder mount 311 attached to a first end of a vertically aligned torque tube 312. A support disk 313 is attached to a second end of the torque tube 312. The pivot fixture cylinder mount 311 defines a bore 316 for connecting a steering actuator to the pivot fixture 310. A lower pivot bushing 314 is attached to the interior of the torque tube 312. The lower pivot bushing 314 and the torque tube 312 each define through holes which, when the lower pivot bushing 314 is inside of the torque tube 312 and the holes are axially aligned, define a through bore 315 for a torque bolt 320. The lower pivot bushing 314, the pivot fixture cylinder mount 311, and the support disk 313 define a bore 318 for receiving the lower axle 330.

A portion of an embodiment of an implement assembly 200 according to the present invention is depicted in FIGS. 5 and 6. An implement assembly 200 comprises a swing arm 210. In this embodiment, the swing arm 210 is a square-section tube, but could be of any suitable shape, as recognized by those of skill in the art. The top face of a small portion of the swing arm 210 is cut away to form a pocket 219. An implement frame bushing 230 is inserted in the interior of the pocket 219 and attaches to the swing arm 210. A cover 220 closes the pocket 219 and holds the implement frame bushing 230 in place. A bore 231 for receiving the lower axle 330 is defined by the implement frame bushing 230, the cover 220 and the swing arm 210. A grease fitting 240 is attached to the exterior of the swing arm 210 and is adapted to allow grease or some other lubricant to be introduced to the interior of the implement frame bushing 230.

Lower axle 330 comprises a lower axle tube 331. An end portion of the lower axle tube 331 is inserted into and attached to a lower axle bushing 338, which is in turn inserted into and attached to a vertically aligned lower tube 333. A support disk 337, defines a bore 337a for receiving the lower axle tube 331, and the support disk 337 is fitted around the lower axle tube 331 and attached to the lower tube 333. The lower tube 333 is also attached to a vertically aligned side tube 334. An end portion of the lower tube 333 defines a bore 333a for receiving a first spindle bushing 335. An end portion of the side tube 334 defines a bore 334a for receiving a second spindle bushing 335. An end cap 336 covers the top, open end of the side tube 334. The lower axle tube 331 defines a bore 332 for receiving the torque bolt 320.

In operation, the lower axle tube 331 is inserted through bore 231 of the implement assembly 200, through bore 318 of the pivot fixture 310, and through bore 396 of the extension arm 190. The torque bolt 320 passes through the aligned bore 315 of the pivot fixture and bore 332 of the lower axle and is secured by a nut and washers.

An implement pivot link, which is in this embodiment a pivot actuator 250, extends between the pivot fixture 310 and the swing arm 210. A lug mount 317 is attached to the exterior of the torque tube 312. A first end of the implement pivot actuator 250 connects to the pivot fixture 310 at lug mount 317, using any suitable connector, such as a bolt. A second end of the implement pivot actuator 250 connects to the swing arm 210, using any suitable fastening system.

A steering link, which is in this embodiment a steering actuator 301, extends between the extension arm 190 and the pivot fixture 310. A first end of the steering actuator 301 connects to the extension arm 190 at bore 395, using any suitable fastening system. A second end of the steering actuator 301 connects to the pivot fixture 310 at bore 316, using any suitable connector, such as a bolt.

With this construction, upon activation of the steering actuator 301, the pivot fixture 310, the implement assembly 200, the lower axle 330, and the wheels attached to the lower axle 330 will pivot together, as one unit, about the vertical axis Q. The grease fittings 193 attached to the extension arm cylinder mount 392 allow a lubricant to be inserted between the surfaces of the extension arm 392 and pivot fixture cylinder mount 311 to aid in the relative rotation which occurs between these surfaces.

In the embodiment of FIGS. 5 and 6, the steering link is a steering actuator 301, which is further a hydraulic cylinder. However, instead of the steering actuator 301, the position of the pivot fixture 200, the lower axle 330, and the wheels relative to the frame assembly 100 may be fixed at desirable orientations by use of a set of links, which are not shown, each of predetermined length, which attach between the extension arm cylinder mount 392 through bore 395, and to the pivot fixture cylinder mount 311 through bore 316. Further, the steering actuator 301 may also be a pneumatic cylinder, an electric lead screw, or any other of a number of mechanisms, as recognized by those of skill in the art.

Also with this construction, upon activation of the implement pivot actuator 250, the implement assembly 200 will pivot about the vertical axis Q independently of the extension arm 190, the pivot cylinder 310, and the lower axle 330.

In the embodiment of FIGS. 5 and 6, the implement pivot link is a pivot actuator 250, which is further a hydraulic cylinder. However, instead of implement pivot actuator 250, an implement pivot link, which is not shown, may be used to fix the rotational position of the implement assembly 200. The implement pivot link may be attached to the pivot fixture 310 at the lug mount 317, and to the implement frame swing arm 210 by conventional means, and extend therebetween. Further, the implement pivot actuator 250 may also be a pneumatic cylinder, an electric lead screw, or any other appropriate actuator, as recognized by those of skill in the art.

If the work implement positioning apparatus is to be towed behind a tractor or other vehicle, then a tongue assembly 400 may be attached to the main frame to facilitate towing the apparatus. As recognized by those of ordinary skill in the art, a hitch for facilitating towing of the apparatus may be formed of many different designs, of which the following illustrative embodiment is only one.

In the illustrative embodiment of FIGS. 7 and 8, the tongue assembly 400 comprises a horizontally disposed tongue tube 410, and a vertically disposed hitch tube 420, attached to the tongue tube 410 at a substantially right angle. The tongue tube 410 has a first end 411 and a second oppositely disposed end 412. The hitch tube 420 has a first end 421 and a second end 422. The tongue tube 410 and the hitch tube 420 may be joined together at an approximately right angle at their first ends 411 and 421. They may be joined, for example, using a miter joint, in which case gusset plates 430 may be attached to the exterior surfaces of both tubes 410, 420 for reinforcing the miter joint. A hitch 440, comprising two parallel, spaced-apart plates 442 and 443, is attached to the second end 422 of the hitch tube 420. The hitch 440 also comprises a pattern of bolt holes 441 which facilitate the attachment of the hitch 440 of the tongue assembly 400 to the hitch of a tractor or other suitable vehicle. A clevis hitch 450 is attached to the second end 412 of the tongue tube 410. The clevis hitch 450 comprises two parallel, spaced-apart plates 451 and 452. A bore 453 is defined by two axially aligned holes in the plates 451 and 452. A clevis pin 454 is inserted into the bore 453. A swing lug 460 is mounted to the tongue tube 410 between the first end 411 and second end 412 of the tongue tube 410. The swing lug 460 defines a bore 461. The swing actuator 101, connects to the tongue assembly 400 at the bore 461 of the swing lug 460.

Figure 9:
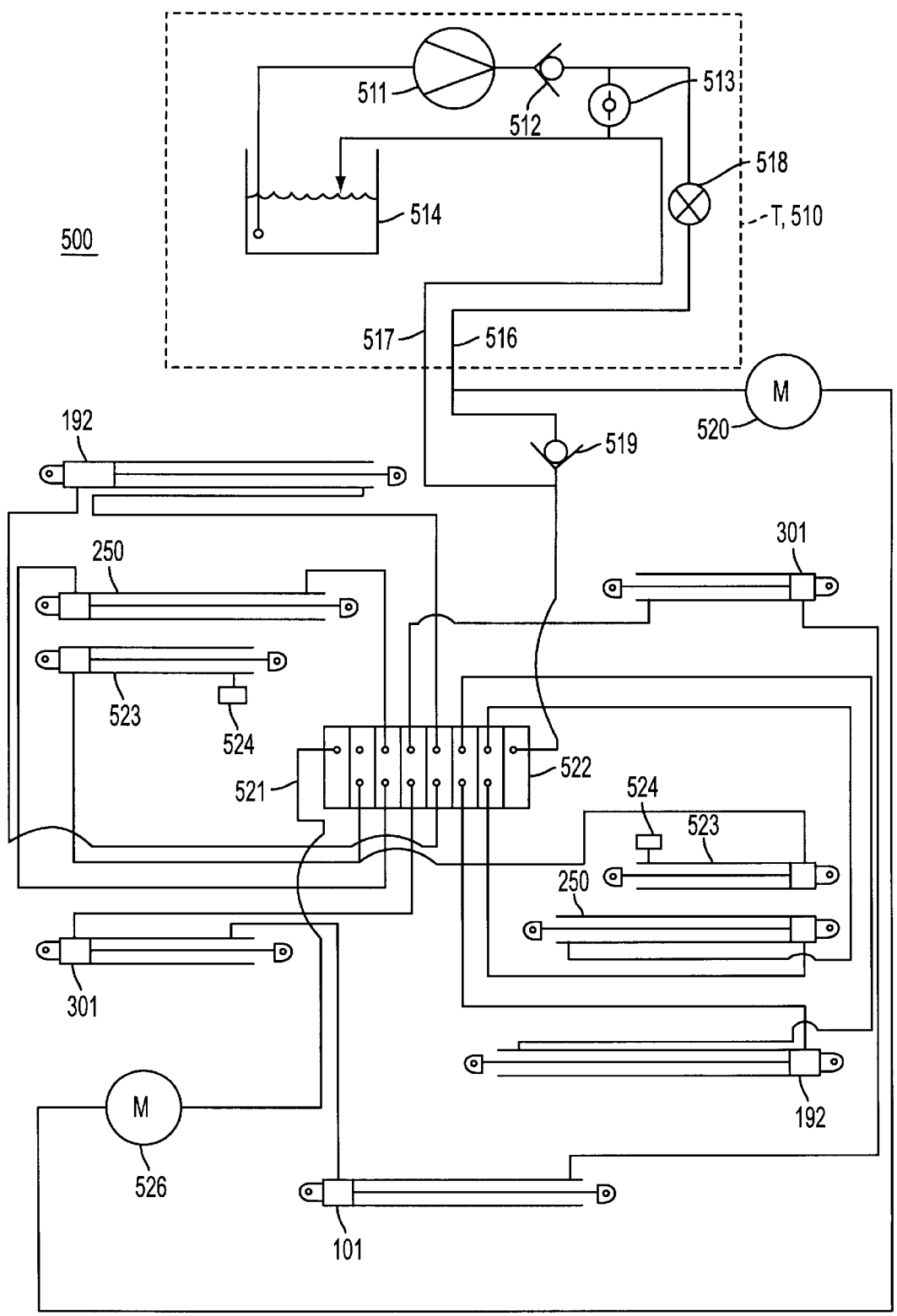
FIG. 9 is a schematic diagram of an illustrative embodiment of a hydraulic system for a positionable work implement according to the present invention.

FIG. 9 depicts one illustrative embodiment of a hydraulic system for a positionable work implement according to the present invention. The hydraulic system 500 includes a pump 511, a back-flow preventer valve 512, a pressure relief valve 513, a reservoir 514, a flow-control valve 518, a feed line 516, and a return line 517. Each of the elements inside the box 510 of FIG. 9 may be alternatively provided with the positionable work implement, or may be provided on the tractor T, or other suitable vehicle, which may be used to propel the positionable work implement.

The hydraulic system 500 of FIG. 9 is especially suitable for a positionable hay rake according to the present invention. The hydraulic system 500 may be modified for use with other possible embodiments of the present invention. The feed line 516 and the return line 517 are bridged by a check valve 519. The feed line 516 feeds a motor 520. The motor 520 powers a rake basket for rotational movement. The motor 520 empties to feed line 525. Feed line 525 feeds motor 526. Motor 526 powers another rake basket for rotational movement. Motor 526 empties to feed line 521. Feed line 521 feeds valve 522. Valve 522 is a six function valve. Valve 522 reversibly activates the hydraulic extension cylinders 192, the implement pivot actuators 250, the steering actuators 301, and the swing actuator 101. Valve 522 also activates implement lift cylinders 523. Implement lift cylinders 523 may be single-acting hydraulic cylinders because they typically only need to exert a force in one direction to lift the work implements. Thus, each of the implement lift cylinders 523 includes a breather 524. Valve 522 empties to return line 517.

Several advantages of the hydraulic system 500 will now be described. In hydraulic system 500, the motors 520 and 526 are provided in a serial configuration. Thus, in operation, the rotational speed of motor 520 should substantially equal the rotational speed of motor 526. The steering actuators 301 and the swing actuator 101 are also provided in a serial configuration. With this serial configuration, the steering actuators 301 will automatically cause the wheel assemblies 300 to pivot in response to the pivoting of the frame assembly 100 caused by the swing actuator 101. The steering actuators 301 and the swing actuator 101 may also be provided in a parallel configuration. In other words, the steering actuators 301 and the swing actuator 101 may share the same feed and return lines. With a parallel configuration, the design of the hydraulic system can be somewhat simplified. Further, the design of hydraulic system 500 is simplified in that only one feed line 516 and only one return line 517 is required from a tractor T, or other suitable propelling vehicle, if used. Those of skill in the art will recognize that other arrangements of a hydraulic system 500 would accompany different embodiments of the present invention.

A basket rake 700, shown in FIG. 10, is one example of a work implement which could form part of an implement assembly 200. Typically, a basket rake 700 comprises several elongated tine bars 710. The first ends 711 of each of the tine bars 710 are attached in a circumferentially spaced manner to the outer circumference of a first tine bar support such as a star wheel 720. The second ends 712 of each of the tine bars 710 are attached in a circumferentially spaced manner to the outer circumference of a second tine bar support such as a star wheel 730. Tine bar supports generally do not need to be star shaped, they need only be rotatable and provide attachment points for the tine bars 710. The attachments of the tine bars 710 to the star wheels 720, 730 are accomplished using rotary pin joints 714. The star wheels 720, 730 are mounted to a frame 740 for rotational movement. The axes of rotation of star wheels 720, 730 are parallel and offset relative to each other. During operation of the basket rake 700, the star wheels 720, 730 are rotated at the same speed in the same direction. The resultant motion of the tine bars 710 has a first component of movement in a vertical direction. As the star wheels 720, 730 complete one revolution, a tine bar 710 will first move in a vertical direction, away from the surface of the ground, then will move in an opposite vertical direction, towards the ground, and then will move again in a vertical direction away from the ground, returning to its original vertical position when the star wheels 720, 730 complete their full revolution. The resultant motion of the tine bars 710 has another component of movement in a horizontal direction, along an axis stretching from the centers of each of the star wheels 720, 730. As the star wheels 720, 730 complete one revolution, a tine bar 710 will first move in a horizontal direction, away from star wheel 720 and towards star wheel 730, then will move in an opposite horizontal direction, away from star wheel 730 and towards star wheel 720, and then will move again in a horizontal direction away from star wheel 720 and towards star wheel 730, returning to its original horizontal position when the star wheels 720, 730 complete their full revolution.

A plurality of tines 713 are individually mounted on the tine bars 710 in a downward facing configuration. As the star wheels 720, 730 rotate in one direction, a set of tines 713 contained on an individual tine bar 710 will begin a downward phase of vertical movement from a position where the tines 713 are spaced from and above the ground, downward to a position where the tines 713 are close to or touching the ground. The set of tines 713 will simultaneously have a horizontal phase of movement in direction along an axis stretching from the centers of each of the star wheels 720, 730 away from star wheel 720 and towards star wheel 730. The set of tines 713 will then begin an upward phase of vertical movement from a position where the tines 713 are close to or touching the ground, upward to a position where the tines 713 are spaced from and above the ground. The set of tines 713 will simultaneously have a horizontal phase of movement in a direction along an axis stretching from the centers of each of the star wheels 720, 730 away from star wheel 730 and towards star wheel 720. These phases of movement will eventually result in the set of tines 713 returning to their original position as the star wheels 720, 730 complete one full revolution. It is these phases of movement of the tines 713 which effects the raking action.

The tines 713 may be mounted to the tine bars 710 using a resilient attachment so that the tines 713 deflect if they strike the surface of the ground. The basket rake 700 may be adjustably mounted within the implement assembly 200 to permit vertical adjustment of the basket rake 700 towards and away from the ground.

The desired rotational speed of the star wheels 720, 730 necessary for effective raking relates to the speed of the basket rake 700 relative to the ground. If the star wheels 720, 730 do not rotate quickly enough relative to the basket rake's 700 speed over the ground, the raking will not be effective. The rotational speed of the basket rake 700 is limited by the design of the tine bars 710. At relatively high rotational speeds, the tine bars 710 will vibrate excessively between their two ends 711 and 712 mounted to the star wheels 720, 730. The vibration causes stresses in the tine bars 710 which, if strong enough, will cause the tine bars 710 to fail, disabling the basket rake 700. Thus, the rotational speed of the basket rake 700, and ultimately the travelling speed of the basket rake 700 relative to the ground, are limited by the design of the tine bars 710.

According to the another aspect of the present invention, the tine bars 710 may be greatly strengthened by the addition of one or more additional supports for the tine bars 710 besides the star wheels 720, 730. According to the present invention, each tine bar 710 may be additionally supported at a point in between its two ends by a middle tine bar support such as a middle idler disk 600. One possible position of the middle idler disk 600 in the basket rake 700 is illustratively shown in FIG. 11.

FIGS. 12A and 12B illustrate one embodiment of a middle idler disk 600 according to the present invention. In this embodiment, the middle idler disk 600 comprises a support disk 601 having an outer periphery to which rotary joints 714 are attached. In this embodiment, each of the tine bars 710 is effectively divided into separate left and right segments 710a, and 710b, respectively. Each of the segments 710a, 710b connect at one of their ends to the middle idler disk 600 via rotary joints 714.

FIGS. 13A and 13B illustrate another embodiment of a middle idler disk 600 according to the present invention. In this embodiment, the middle idler disk 600 comprises two support disks 601a, 601b. Support disk 601a has an outer periphery to which rotary joints 714 are attached. Rotary joints 714 of support disk 601a further attach to tine bar segments 710a. Support disk 601b has an outer periphery to which rotary joints 714 are attached. Rotary joints 714 of support disk 601b further attach to tine bar segments 710b. The support disks 601a and 601b are attached to each other via attachment shaft 620. Attachment shaft 620 may further comprise two separate shafts so that the support disks 601a and 601b may rotate at different speeds.

FIGS. 14A and 14B illustrate yet another embodiment of a middle idler disk 600 according to the present invention. In this embodiment, the middle idler disk 600 comprises two support disks 601a, 601b. Support disk 601a has an outer periphery to which rotary joints 714 are attached. Rotary joints 714 of support disk 601a further attach to tine bar segments 710a. Support disk 601b has an outer periphery to which rotary joints 714 are attached. Rotary joints 714 of support disk 601b further attach to tine bar segments 710b. The support disks 601a and 601b may be attached to each other via attachment shafts 620a and 620b, which are each attached to a motor 630.

Figure 15:
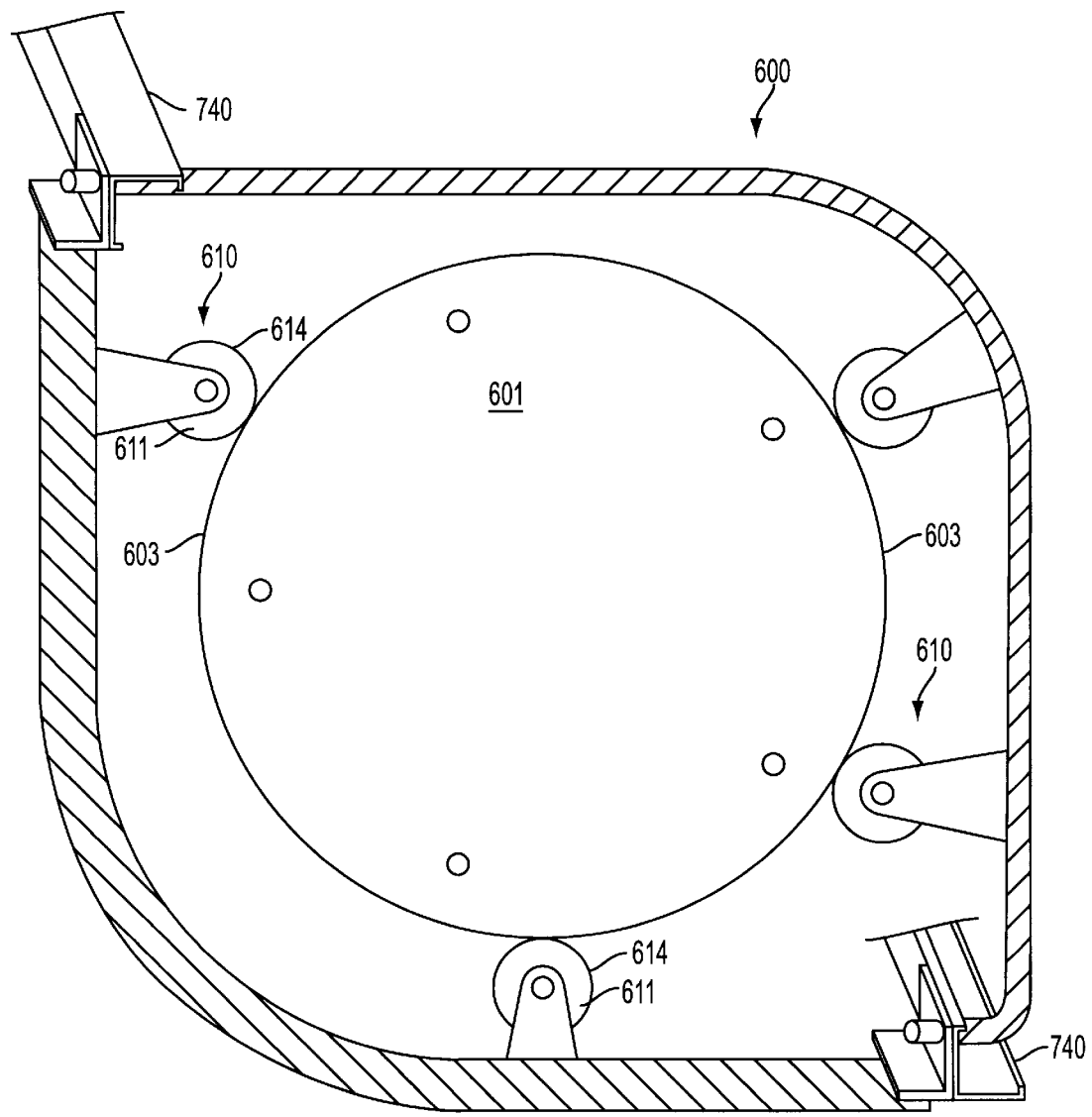
FIG. 15 is a enlarged schematic sectional view of the implement assembly of FIG. 11.

The middle idler disk 600 is supported by frame 740 for rotational movement about an axis approximately in the center of middle idler disk 600. FIG. 15 illustrates one embodiment of a support structure for rotationally supporting a middle idler disk 600 on the frame 740, according to the present invention. The support disk 601 is rotationally supported by several support wheel roller bearings 610. The roller bearings 610 can be standard roller bearings comprising a wheel 611 with an outer periphery 614 rotationally supported in the center of the wheel 611. The outer periphery 614 of each roller bearing 610 is in rolling contact with the outer periphery 603 of the support disk 601. The roller bearings 610 are arranged circumferentially spaced around the outer periphery 603 of the support disk 601. The roller bearings 610 are themselves rotationally mounted about their centers to the frame 740. In this manner, the support wheel 601 is supported by the roller bearings 610 for rotational movement relative to the frame 740 about an axis approximately in the center of the support disk 601.

Figure 16:
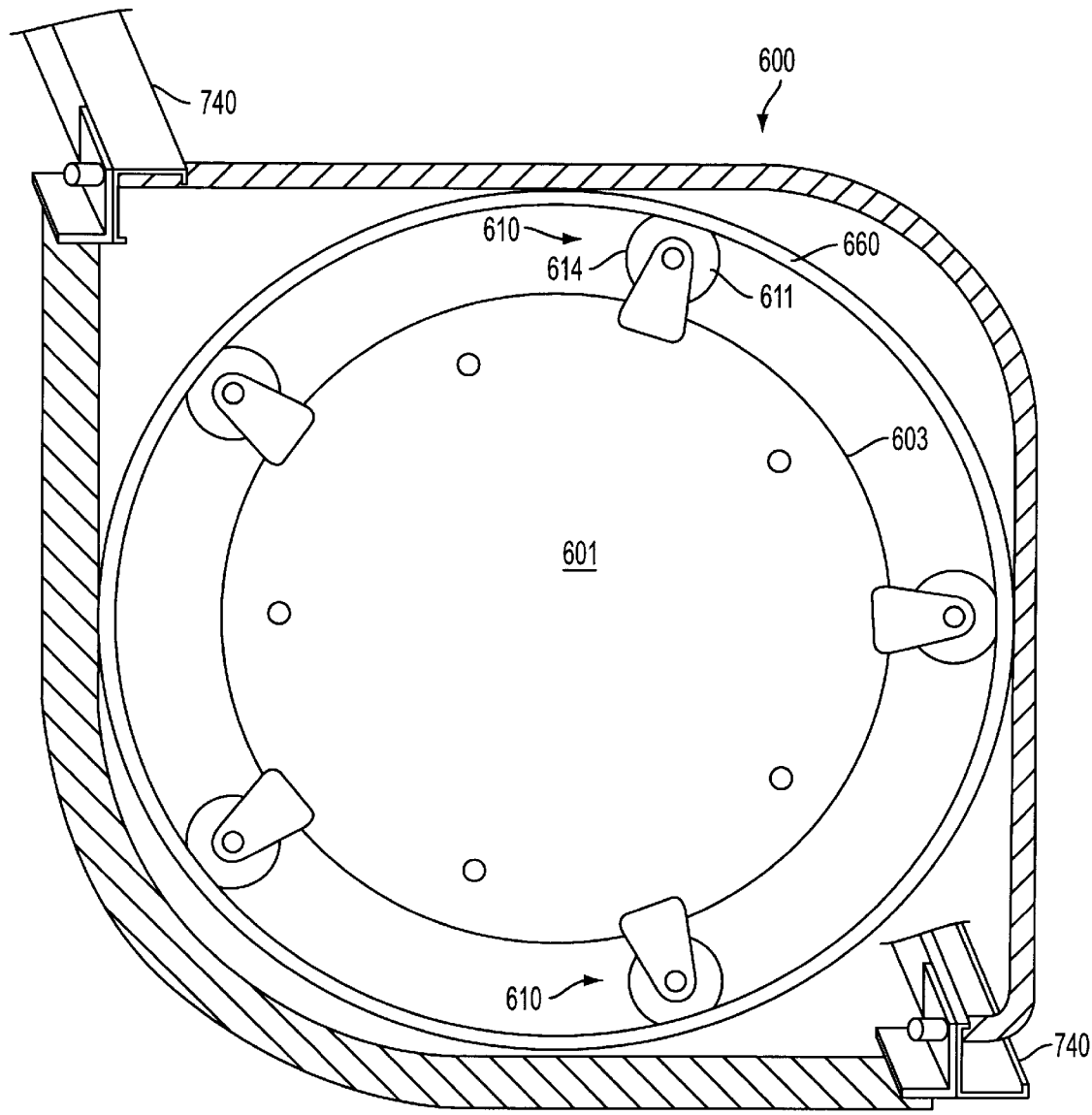
FIG. 16 is a schematic sectional view of an illustrative embodiment of an implement assembly for a positionable work implement according to the present invention.

FIG. 16 illustrates another embodiment of a support structure for rotationally supporting a middle idler disk 600 on the frame 740, according to the present invention. In this embodiment, roller bearings 610 are mounted to the support disk 601 and are spaced circumferentially around the periphery 603 of the support disk 601. The outer periphery 614 of the roller bearings 610 is in rolling contact with a track 660. Track 660 may be formed on the frame 740.

In the various embodiments illustrated in FIGS. 13A, 13B, 14A, and 14B, the middle idler disk 600 may be rotationally mounted on the frame 740 using various methods and support structures. For example, middle idler disk 600 may be rotationally mounted to the frame 740 using standard bearings which will contact connecting shaft 620, or 620a, 620b. Or, simply the motor 630 of FIG. 14A may be supported on the frame 740, with bearings for rotationally supporting support shaft 620a, 620b located integrally within the motor 630.

The middle idler disk 600 provides support to the tine bars 710. With the addition of the middle idler disk 600 to a basket rake 700, a basket rake 700 having tine bars 710 of a given length may be operated at a maximum rotational speed beyond that which was possible without the middle idler disk 600. Since the maximum ground speed of the basket rake 700 is limited by the maximum rotational speed of the basket rake 700, increasing the maximum rotational speed of the basket rake 700 through the addition of the middle idler disk 600 also increases the maximum ground speed of the basket rake 700. Thus, the amount of ground area covered per unit of time by a positionable work implement utilizing such a basket rake 700 is increased. Alternatively, the addition of a middle idler disk 600 to a basket rake 700, allows the length of the tine bars 710, and the basket rake 700, to be increased. An increase in the length of the basket rake 700 translates into an increase in the effective working width of the rake, which increases the amount of ground area covered per unit of time by a positionable work implement utilizing such a basket rake 700. With the addition of two or more middle idler disks 600, it is conceivable to further increase the effective working width and/or the rotational speed of the basket rake 700.

Figure 17:
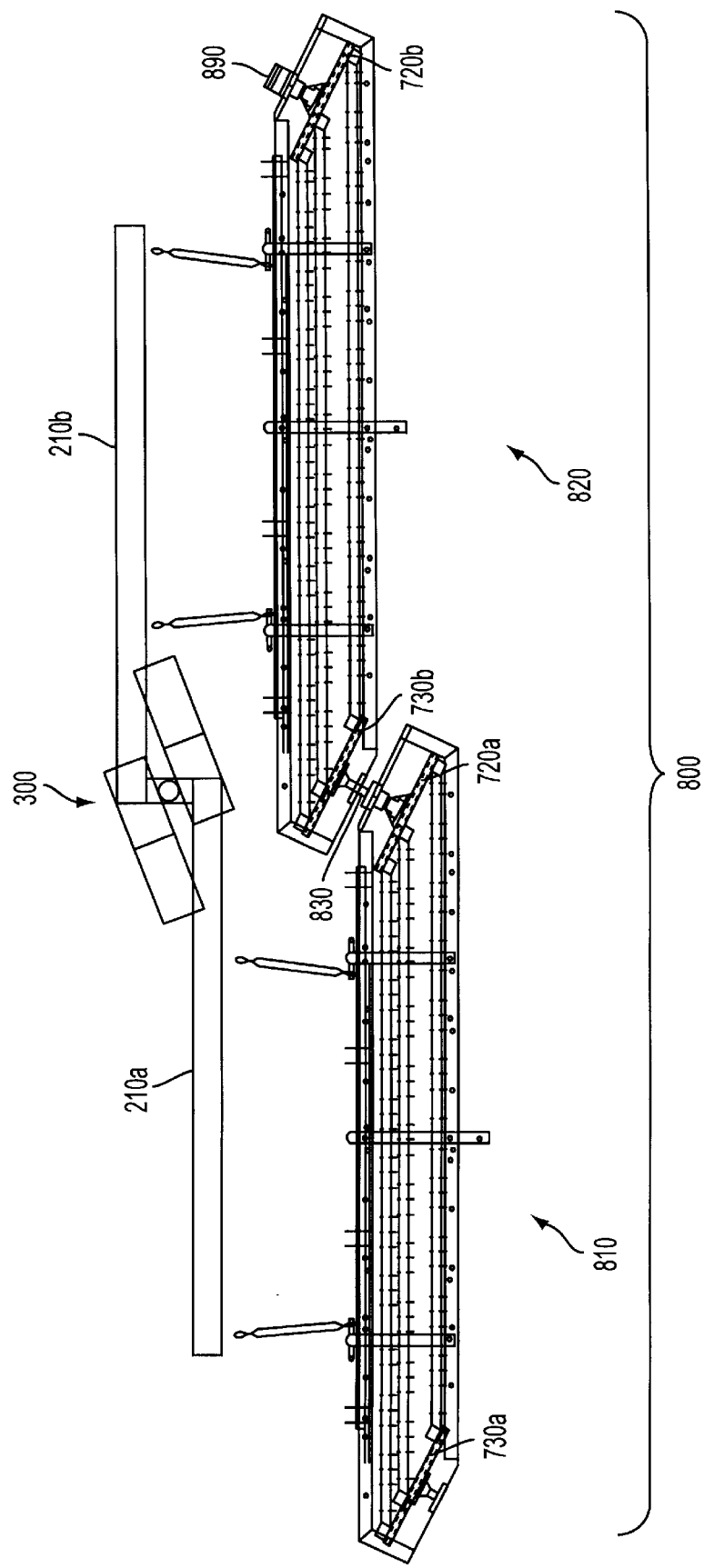
FIG. 17 is a top view of an illustrative embodiment of an implement assembly for a positionable work implement according to the present invention.

According to another aspect of the present invention, the effective working width of a rake may be increased by attaching together two individual rake baskets 810, 820 in a tandem relationship as shown in an illustrative embodiment of rake basket 800 depicted in FIG. 17. In this embodiment, two individual rake baskets 810, 820 are mounted to two swing arms 210a, 210b. The two rake baskets 810, 820 are offset longitudinally, and offset laterally, with one rake basket 810 mounted slightly ahead of the other rake basket 820. Rake basket 810 comprises tine bar supports such as two star wheels 720a, 730a at opposite ends of the rake basket 810. Rake basket 820 comprises two tine bar supports such as star wheels 720b, 730b at opposite ends of the rake basket 820. Star wheel 720a on one end of rake basket 810 and star wheel 730b on an adjacent end of rake basket 820 share a common axis of rotation. These two star wheels 720a, 730b may be joined by a connecting shaft 830, so that when one of the baskets 810 rotates, the other basket 820 also rotates at the same rotational speed. Both of the tandem baskets 810, 820 may be rotationally driven by a common motor 890, or two or more motors 890 may drive the tandem baskets. The tandem baskets 810, 820 may be driven at different rotational speeds. A motor 890 may be mounted to the baskets 810, 820 at either of the two star wheels 720b, 730a on the non-adjacent ends of the baskets 810, 820, or coaxially with and connected to the common drive shaft 830 extending between the two adjacent ends of the baskets 810, 820. In order to utilize individual basket rakes of a greater length or maximum rotational speed than would ordinarily be possible, idler wheels 600 may also be utilized in conjunction with tandem baskets 800. By placing two rake baskets in a tandem relationship as in rake basket 800, the maximum overall length of rake basket 800 is much greater than the maximum overall length of an individual rake basket. Thus, the maximum effective working width of a rake utilizing rake baskets 800 is increased, resulting in increases in speed and efficiency of the rake.

Figure 18:
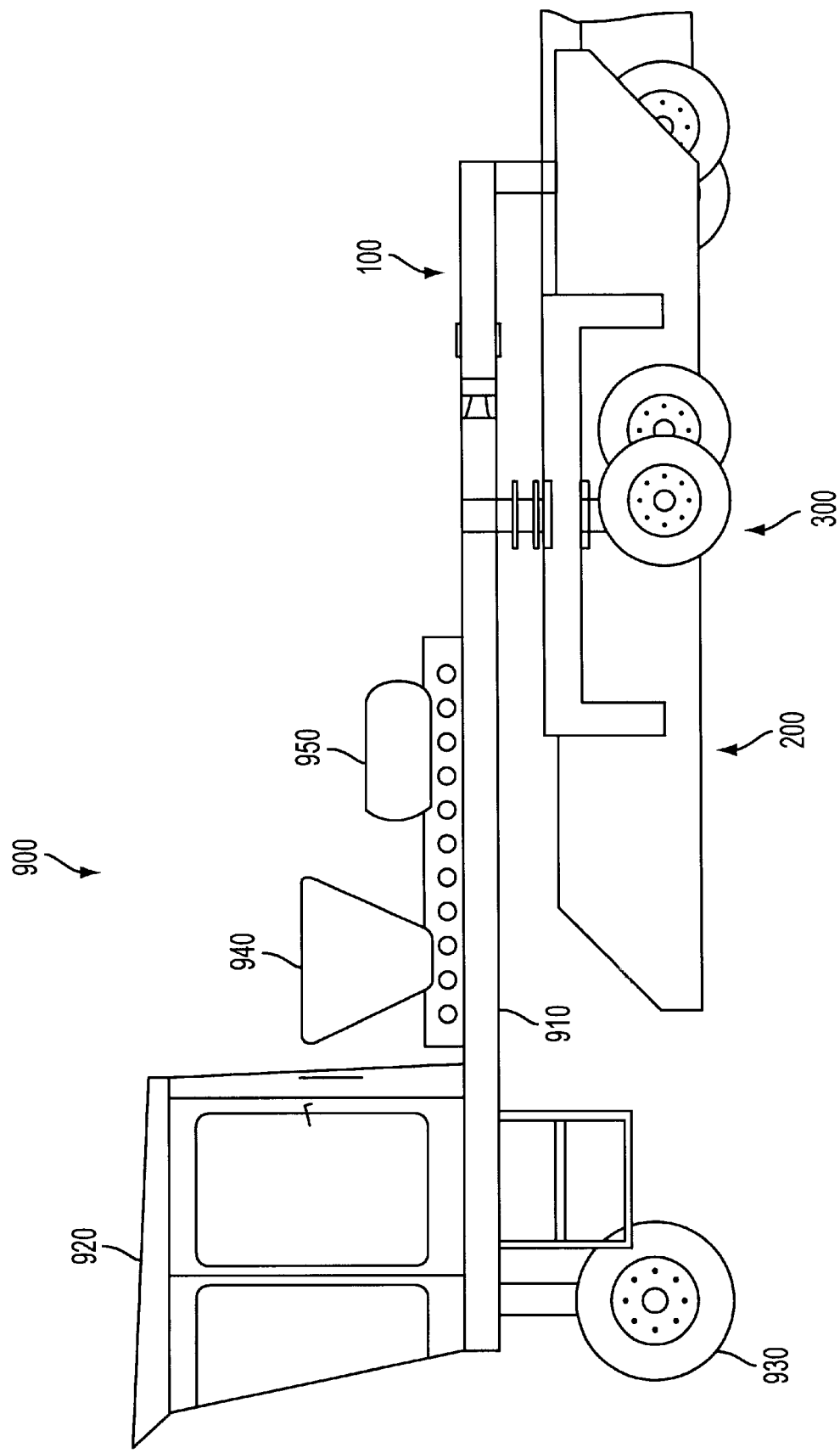
FIG. 18 is a schematic side view of an illustrative embodiment of a positionable work implement according to the present invention.

FIG. 18 illustrates another embodiment according to the present invention. FIG. 18 illustrates a self-propelled positionable work implement 900. While many positionable work implements have, in the past, been designed to be powered by and towed behind a tractor T, this embodiment is self-propelled and need not be towed behind a tractor T. The self-propelled positionable work implement 900 includes (as would be present in other embodiments of the present invention adapted to be towed behind tractors) a main frame assembly 100, left- and right-side implement assemblies 200, and left- and right-side wheel assemblies 300. The self-propelled positionable work implement 900 also includes a connection assembly 910 for supporting an operator's cab 920, a front wheel assembly 930, and a power source 940, which may be, for example, a diesel engine. Generally, connection assembly 910 may be any suitable assembly for supporting the main frame assembly 100 and connecting it to power source 940 so that the main frame assembly 100 can be propelled along the ground. The connection assembly 910 may also support a hydraulic system 950, such as that shown in FIG. 9, if hydraulics are desired to actuate the one or more functions of self-propelled positionable work implement 900. The front wheel assembly 930 may provide motive power and/or steering direction for the self-propelled positionable work implement 900.

Thus, it has been shown that various embodiments of the present invention are useful in providing a wider effective working width for a positionable work implement. When used as a crop processing apparatus, the increased working width of a positionable work implement may reduce the number of passes through a field necessary to perform a given operation on the field. Reducing the number of passes through the field also has the benefit of reducing soil compaction which results from passage of farm equipment over the soil of a field. When soil in a field becomes too compacted, its crop yield is reduced and plowing becomes necessary to improve the soil. In an alfalfa field, for example, the field may be cut five to six times each year for 3–5 years before the field is plowed and re-seeded. Reducing the number of passes through a field may reduce the frequency of plowing and re-seeding the field, as well as increase the crop yield.

The foregoing embodiments of the invention have been presented for the purpose of illustration and description only and are not to be construed as limiting the scope of the invention in any way. The scope of the invention is to be determined from the claims appended hereto.

What is claimed is:

1. A positionable work implement comprising:

a connection assembly for connecting the positionable work implement to a drive mechanism for propelling the positionable work implement in a direction of travel;

a main frame pivotally attached to the connection assembly to permit pivotal movement of the main frame relative to the connection assembly about a substantially vertical axis, the main frame comprising;

at least one telescoping frame section which permits extension of the main frame in the working position to provide a greater width of the main frame transverse to the direction of travel;

at least one implement assembly attached to the main frame;

wherein the main frame pivots about the substantially vertical axis relative to the connection assembly between a working position and a travel position whereby an effective width of the main frame transverse to the direction of travel in the travel position is less than the effective width of the main frame transverse to the direction of travel in the working position; and at least one ground-engaging assembly for providing ground-engaging support to the main frame, said at least one ground-engaging assembly is pivotally attached to the main frame to allow pivotal movement of the main frame relative to the at least one ground-engaging assembly such that the at least one ground-engaging assembly may be generally aligned with the direction of travel for any position of the main frame.

2. The positionable work implement according to claim 1 which comprises at least two ground engaging assemblies, each ground engaging assembly pivotable about a separate substantially vertical axis relative to the main frame.

3. The positionable work implement according to claim 1, wherein the implement assembly further comprises:

a support frame;

a first tine bar support mounted on a first side of the support frame for rotary movement relative to the support frame;

a second tine bar support mounted on a second side of the support frame for rotary movement relative to the support frame;

a middle tine bar support mounted on the support frame between said first and second tine bar supports for rotary movement relative to the support frame;

a first set of multiple tine bars, each tine bar having first and second ends, wherein the first end of each tine bar of the first set is connected to the first tine bar support and the second end of each tine bar of the first set is connected to the middle tine bar support;

a second set of multiple tine bars, each tine bar having first and second ends, wherein the first end of each tine bar of the second set is connected to the second tine bar support and the second end of each tine bar of the second set is connected to the middle tine bar support;

at least one drive motor operably connected to at least one or more of the first, second and middle tine bar supports, the at least one drive motor imparting rotational movement to at least one or more of the first, second and middle tine bar supports; and whereby when the first tine bar support rotates, the first set of tine bars also rotates relative to the support frame, and when the second tine bar support rotates, the second set of tine bars rotates relative to the support frame.

4. The positionable work implement according to claim 3, wherein the middle tine bar support is mounted to the support frame on roller bearings; and wherein the roller bearings are disposed about a periphery of the middle tine bar support.

5. A positionable work implement according to claim 3, wherein the middle tine bar support comprises first and second support disks; and each of the tine bars of the first set of tine bars is attached at its second end to the first disk of the middle tine bar support, and each of the tine bars of the second set of tine bars is attached at its second end to the second support disk of the middle tine bar support.

6. A positionable work implement according to claim 5, wherein the first and second rotary support disks are attached to one another by a shaft so that when one of the first or second support disks rotates, the other of the first or second support disks also rotates; and wherein the shaft is supported on the support frame by a bearing for rotational movement relative to the support frame.

7. A positionable work implement according to claim 1, wherein said implement assembly comprises:

a first support frame;

first and second tine bar supports disposed on opposite sides of the first support frame for rotational movement relative to the first support frame;

a first set of tine bars attached to and extending between the first and second tine bar supports;

a second support frame;

third and fourth tine bar supports disposed on opposite sides of the second support frame for rotational relative to the second support frame;

a second set of tine bars attached to and extending between the third and fourth tine bar supports;

at least one drive motor operably connected to one or more of the first, second, third and fourth tine bar supports, the at least one drive motor imparting rotational movement to one or more of said first, second, third and fourth tine bar supports;

wherein when the first and second tine bar supports rotate, the first set of tine bars rotates relative to the frame, and when the third and fourth tine bar supports rotate, the second set of tine bars rotates relative to the frame; and wherein the first and second support frames are capable of being positioned in a tandem relationship such that one end of the first support frame is substantially adjacent to one end of the second support frame.

8. The positionable work implement according to claim 7 further comprising:

a coupling shaft which connects one of the first and second tine bar supports to one of the third and fourth tine bar supports so that the first, second, third and fourth tine bar supports rotate together.

9. The positionable work implement according to claim 7, wherein the longitudinal axis of the first support frame is substantially parallel with the longitudinal axis of the second support frame.

10. The positionable work implement according to claim 9, wherein the longitudinal axis of the first support frame is offset from the longitudinal axis of the second support frame.

11. The positionable work implement according to claim 7, wherein the at least one drive motor comprises first and second drive motors; and wherein the first drive motor is operably connected to and imparts rotary motion to the first and second tine bar supports, and the second drive motor is operably connected to and imparts rotary motion to the second and third tine bar supports.

12. The positionable work implement according to claim 1,
wherein the connection assembly is a tongue assembly for connecting the positionable work implement to a separate device to provide propulsion to the positionable work implement.

13. The positionable work implement according to claim 12 further comprising:
a hydraulic cylinder operatively connected between the tongue assembly and the main frame to pivot the main frame relative to the connection assembly about the substantially vertical axis.

14. The positionable work implement according to claim 1,
wherein the positionable work implement is self-propelled and said connection assembly forms part of the device for providing propulsion to the positionable work implement.

15. The positionable work implement according to claim 1 further comprising:
a hydraulic cylinder operatively connected between the connection assembly and the main frame to pivot the main frame relative to the connection assembly about the substantially vertical axis.

16. An implement assembly for use with a positionable work implement comprising:
a support frame;
a first tine bar support mounted on a first side of the support frame for rotary movement relative to the support frame;
a second tine bar support mounted on a second side of the support frame for rotary movement relative to the support frame;
a middle tine bar support mounted on the support frame between said first and second tine bar supports for rotary movement relative to the support frame;
a first set of multiple tine bars, each tine bar having first and second ends, wherein the first end of each tine bar of the first set is connected to the first tine bar support and the second end of each tine bar of the first set is connected to the middle tine bar support;
a second set of multiple tine bars, each tine bar having first and second ends, wherein the first end of each tine bar of the second set is connected to the second tine bar support and the second end of each tine bar of the second set is connected to the middle tine bar support;
at least one drive motor operably connected to at least one or more of the first, second and middle tine bar supports, the at least one drive motor imparting rotational movement to at least one or more of the first, second and middle tine bar supports; and
whereby when the first tine bar support rotates, the first set of tine bars also rotates relative to the support frame, and when the second tine bar support rotates, the second set of tine bars rotates relative to the support frame.

17. The implement assembly according to claim 16,
wherein the middle tine bar support is mounted to the support frame on roller bearings.

18. The implement assembly according to claim 17,
wherein the roller bearings employed to mount the middle tine bar support are disposed about a periphery of the middle tine bar support.

19. The implement assembly according to claim 18,
wherein the roller bearings are affixed to the middle tine bar support and a peripheral track is attached to the support frame in a position whereby the roller bearings of the middle tine bar support can roll in the track when the middle tine bar support rotates.

20. The implement assembly according to claim 18,
wherein the roller bearings are affixed to the support frame and a peripheral track is provided on the middle tine bar support in a position whereby the roller bearings of the support frame can roll in the track when the middle tine bar support rotates.

21. The implement assembly according to claim 16,
wherein the middle tine bar support comprises first and second support disks; and
each of the tine bars of the first set of tine bars is attached at its second end to the first disk of the middle tine bar support, and each of the tine bars of the second set of tine bars is attached at its second end to the second support disk of the middle tine bar support.

22. The implement assembly according to claim 21,
wherein the first and second support disks are attached to one another by a shaft so that when one of the first or second support disks rotates, the other of the first or second support disks also rotates; and
wherein the shaft is supported on the support frame by a bearing for rotational movement relative to the support frame.

23. An implement assembly for use with a positionable work implement comprising:
a first support frame;
first and second tine bar supports disposed on opposite sides of the first support frame for rotational relative to the first support frame;
a first set of tine bars attached to and extending between the first and second tine bar supports;
a second support frame;
third and fourth tine bar supports disposed on opposite sides of the second support frame for rotational relative to the second support frame;
a second set of tine bars attached to and extending between the third and fourth tine bar supports;
at least one drive motor operably connected to one or more of the first, second, third and fourth tine bar supports, the at least one drive motor imparting rotational movement to one or more of said first, second, third and fourth tine bar supports;
wherein when the first and second tine bar supports rotate, the first set of tine bars rotates relative to the frame, and when the third and fourth tine bar supports rotate, the second set of tine bars rotates relative to the frame; and
wherein the first and second support frames are capable of being positioned in a tandem relationship such that one end of the first support frame is substantially adjacent to one end of the second support frame.

24. The implement assembly according to claim 23 further comprising:
a coupling shaft which connects one of the first and second tine bar supports to one of the third and fourth tine bar supports so that the first, second, third and fourth tine bar supports rotate together.

25. The implement assembly according to claim 24,
wherein the longitudinal axis of the first support frame is substantially parallel to the longitudinal axis of the second support frame.

26. The implement assembly according to claim 25, wherein the longitudinal axis of the first support frame is offset from the longitudinal axis of the second support frame.

27. The implement assembly according to claim 23, wherein the drive motor is located between the two sets of tine bars and is operably connected to one of the first and second tine bar supports and operably connected to one of the third and fourth tine bar supports to impart rotational movement thereto.

28. The implement assembly according to claim 23, wherein the at least one drive motor comprises first and second drive motors; and wherein the first drive motor is operably connected to and imparts rotary motion to the first and second tine bar supports, and the second drive motor is operably connected to and imparts rotary motion to the second and third tine bar supports.

* * * * *